United States Patent
Mege et al.

(10) Patent No.: US 8,040,967 B2
(45) Date of Patent: Oct. 18, 2011

(54) NOISE POWER INTERPOLATION IN A MULTI-CARRIER SYSTEM

(75) Inventors: Philippe Mege, Bourg la Reine (FR); Christophe Brutel, Cagnes (FR)

(73) Assignee: EADS Secure Networks, Elancourt (FR)

( * ) Notice: Subject to any disclaimer, the term of this patent is extended or adjusted under 35 U.S.C. 154(b) by 650 days.

(21) Appl. No.: 12/089,073

(22) PCT Filed: Oct. 5, 2006

(86) PCT No.: PCT/IB2006/003886
§ 371 (c)(1),
(2), (4) Date: Jul. 28, 2008

(87) PCT Pub. No.: WO2007/039834
PCT Pub. Date: Apr. 12, 2007

(65) Prior Publication Data
US 2009/0122900 A1    May 14, 2009

(30) Foreign Application Priority Data
Oct. 5, 2005   (FR) ...................................... 05 10195

(51) Int. Cl.
*H04L 5/12* (2006.01)
*H04L 23/02* (2006.01)
(52) U.S. Cl. ........ 375/261; 375/260; 375/267; 375/346; 375/347; 375/349; 370/204; 370/206
(58) Field of Classification Search .......... 375/260–261, 375/267, 346–350; 370/203–211
See application file for complete search history.

(56) References Cited

U.S. PATENT DOCUMENTS
2003/0210749 A1* 11/2003 Asjadi ........................... 375/260
2005/0135324 A1    6/2005 Kim et al.

FOREIGN PATENT DOCUMENTS
WO    WO 03/024041    3/2003

OTHER PUBLICATIONS
International Search Report; from corresponding PCT Application PCT/IB2006/03886, May 4, 2007.

* cited by examiner

*Primary Examiner* — Curtis B Odom
(74) *Attorney, Agent, or Firm* — Miller, Matthias & Hull LLP

(57) ABSTRACT

A signal is received in a telecommunication network in the form of P signals received on P corresponding antennas, where P is greater than or equal to 1. The received signals correspond to a multi-carrier signal transmitted in the form of flames comprising symbols occupying corresponding positions distributed along a time axis and along a frequency axis; a frame comprising M blocks each having at least N reference symbols. The reference symbols in each of the blocks satisfy a first maximum spacing between each other along the time axis and a second maximum spacing between each other along the frequency axis, less than a first value and a second value respectively, M being an integer number equal to at least two. M estimated noise power values are determined at frame level, each related to one of the M emitted reference symbol blocks. Values of the estimated noise power for the other symbols in the frame are then obtained from the determined estimated noise power values.

21 Claims, 5 Drawing Sheets

NOISE POWER INTERPOLATION IN A MULTI-CARRIER SYSTEM

CROSS-REFERENCE TO RELATED APPLICATION

This application is a U.S. National Stage Application of PCT Application No. PCT IB2006/003886, filed on Oct. 5, 2006, which claims priority under the Paris Convention to French Patent Application No. FR 05 10195, filed on Oct. 5, 2005.

FIELD OF DISCLOSURE

This invention relates to reception of multi carrier radio communication signals particularly of the OFDM (Orthogonal Frequency Division Multiplexing) type. It is applicable in telecommunication networks, and more particularly the invention aims at a method for reception of a signal and for estimating the likelihood of transmitted information that is based on an estimate of the noise power of the received signal.

BACKGROUND OF THE DISCLOSURE

During its transmission in a radio communication network, a signal is affected by disturbances of the propagation channel on which it is emitted. These disturbances have the effect of modifying the received signal compared with the emitted signal. These modifications to the received signal degrade the signal to noise ratio.

For example, one conventional manner of limiting the influence of disturbances of the propagation channel on a transmitted signal, is to use a signal processing method intended to transform the received signal into a processed signal such that the processed signal is closer to the emitted signal than the received signal. Thus, as the performance of the signal processing method improves, the processed signal becomes closer to the emitted signal and consequently the signal to noise ratio becomes higher. This provides a method of improving the performances of these reception systems by using a high performance signal processing method. Note that in the context of this document, the term "noise" refers to both decorrelated noise and correlated noise, in other words also interference noise.

Conventionally, a signal reception system may be adapted to receive signals on P antennas, where P is a number greater than or equal to 1, and to generate a processed signal by applying one of these signal processing methods to the signal(s) received by the corresponding antennas.

Regardless of the number P of antennas that receive the emitted signal, the performance level of such a reception system is dependent on the processing method applied to the signal(s) received on the antenna(s) to generate the processed signal.

Some of these signal processing methods are used firstly to estimate a value of transmitted information, and also to estimate a likelihood value of this transmitted information. This likelihood value represents an image of the probability that the estimate made is correct. A likelihood with a high absolute value indicates that the estimate made is probably correct, and a likelihood for which the absolute value is low indicates that the estimate made only has a low probability, for example of the order of 55 to 60%, a likelihood with a zero value indicates that there is no way of deciding whether the value of the information transmitted is 0 or 1. The sign of a likelihood value indicates the value (0 or 1) of a corresponding binary information estimate. Conventionally, a likelihood value (V) satisfies the following equation:

$$V(X) = \text{Log}\left(\frac{\text{Probability}(X = 0/Y)}{\text{Probability}(X = 1/Y)}\right)$$

where Log(z) represents the Napierian logarithm of z;
where X is the emitted information for which an estimate is required;
where Y is the received signal corresponding to the transmitted information that is to be estimated.

Such an expression means that a likelihood value of information X is equal to the Napierian logarithm of the ratio of the probability that the information X was emitted with the value 0 knowing that the corresponding received signal is Y, to the probability that the information X was emitted with the value 1 knowing that the corresponding received signal is Y. In this context, the probabilities are usually calculated assuming that noise present during the transmission and interference globally correspond to a Gaussian distribution noise and the variance of this Gaussian distribution corresponds to the average noise power.

An estimate of the average noise power presents on a given propagation channel may be very useful to the receiver, particularly to estimate a likelihood value of transmitted information.

For example, the likelihood of transmitted information (also called "soft bit") is conventionally used at the input to channel decoding processing on reception, when a channel coding processing is done at the emission. Use of a likelihood value as a basis rather than only an information value (also called hard bit) indicated by the sign of the likelihood of the information, provides a means of significantly improving the channel decoding performances and therefore the system performances in terms of resistance to errors, for example due to propagation on the transmission medium.

For example, one of these signal processing methods is called the "antenna diversity method". One antenna diversity method consists of estimating the initially transmitted signal from the received signal based on a propagation channel estimate, for each antenna, and then to summating the signals thus estimated on each antenna to generate a processed signal, then called a "composite signal" in the framework of multi-antenna systems. A value of an average noise power can be estimated for such an "antenna diversity method".

Therefore this type of signal reception system takes account of information about the reception noise of the signal, for example so as to calculate information likelihood values as precisely as possible. In such a context, as the information about noise becomes more accurate and more correct, the performance of the multi-carrier signal reception system can improve.

This invention is designed to improve information about noise supplied in this type of signal reception system, and thus improve the performances of such a system.

SUMMARY OF THE DISCLOSURE

A first aspect of this invention proposes a signal reception method in a telecommunication network comprising reception of a number P of signals on P corresponding antennas, where P is an integer greater than or equal to 1. The received signals correspond to a multi-carrier signal transmitted in the form of successive frames comprising symbols occupying corresponding positions distributed along a time axis and along a frequency axis; one frame comprising M blocks each with at least N reference symbols. The reference symbols in each of the blocks satisfy a first maximum spacing between each other along the time axis and a second maximum spacing between each other along the frequency axis, less than a first value and a second value respectively, where N is an integer number greater than or equal to P+1, and M is an integer number equal to at least two.

The process is based on an estimate of the noise power, including the following steps:

/a/ determine M estimated noise power values at frame level, each related to one of the M emitted reference symbol blocks;

/b/ obtain values of the estimated noise power relative to other symbols in the frame by interpoling said M estimated noise power values.

A second aspect of this invention proposes a signal reception device adapted for use of a method according to the first aspect of this invention.

A third aspect of this invention proposes a signal reception system comprising an emission device (11) adapted to emit a multi-carrier signal transmitted in the form of successive frames comprising symbols occupying corresponding positions distributed along a time axis and along a frequency axis; one frame comprising M blocks each with at least N reference symbols, the reference symbols in each of said blocks satisfying a first maximum spacing between each other along the time axis and a second maximum spacing between each other along the frequency axis, less than a first value and a second value respectively, where N is an integer number greater than or equal to P+1 and M is an integer number greater than or equal to two; and a reception device according to the second aspect of this invention.

Other aspects, purposes and advantages of the invention will become clearer after reading the description of one of its embodiments.

BRIEF DESCRIPTION OF THE DRAWING

The invention will also be better understood with reference to the figures, wherein.

DETAILED DESCRIPTION

The invention is described below in its application to multi-carrier systems, for example such as OFDM (Orthogonal Frequency Division Multiplexing) systems. The system is applicable for conventional OFDM transmissions and also for OFDM/IOTA (Isotropic Orthogonal Transform Algorithm) type transmissions and for OFDM/OQAM (Offset Quadrature Amplitude Modulation) type transmissions. The article entitled "Coded Orthogonal Frequency Division Multiplex", Bernard LE FLOCH et al., Proceedings of the IEEE, Vol. 83, No. 6, June 1995 provides an example definition of an orthogonal time/frequency network with an OFDM structure. In particular, document FR19950005455 describes one structure adapted for an OFDM/IOTA type transmission.

This description is not limitative and it should be noted that this invention may be simply and efficiently applied in other types of telecommunication networks.

Figure 1:
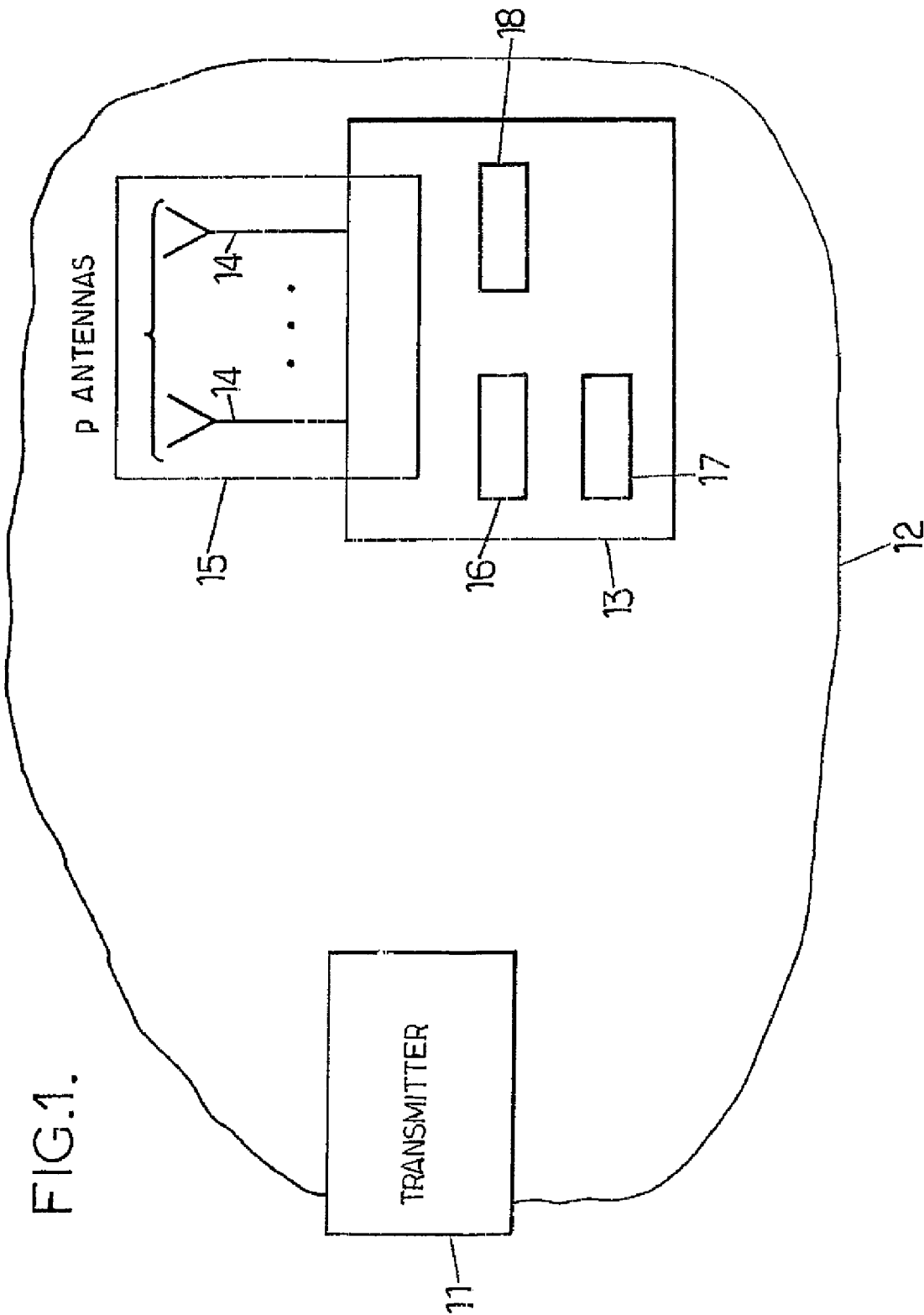
FIG. 1 shows a telecommunication network according to one embodiment of this invention.

FIG. 1 shows a telecommunication network comprising an emitter 11 and a receiver 13 according to one embodiment of this invention. The receiver 13 includes a number P of antennas 14, each being adapted to receive the signal transmitted by the emitter 11. The number P is greater than or equal to 1.

The receiver 13 includes a reception unit 15 with P antennas, each adapted to receive a given frame of the signal. It includes a unit to determine values of the noise power 16 adapted to determine values of the noise power for the corresponding reference symbol blocks in an emitted frame.

The receiver also includes a procurement unit 17 adapted to obtain values of the estimated noise power for frame symbols other than those included in reference symbol blocks, starting from noise power values determined by the determination unit 16.

One method according to one embodiment of this invention is intended to supply an estimated noise power e for the different symbols in a frame so as to calculate a likelihood value as precisely as possible for each item of information transmitted on the frame. More precisely, the first phase of such a method is intended to determine a value of the estimated noise power relative to at least two reference symbol blocks in the frame. In a second phase, it then uses these at least two estimated noise power values to determine an estimated noise power value for all other symbols in the frame.

In the case of the transmissions considered in the following sections as an example, information symbols are transmitted in parallel on several sub-channels in a frame, according to a time and frequency distribution. Consequently, each symbol $S_{i,j}$ in a frame may be identified by its position determined by two coordinates, a coordinate i along a time axis and a coordinate j along a frequency axis, this coordinate corresponding to a transmission sub-channel number.

Subsequently, a reference symbols block may be defined as being a group of reference symbols in which each symbol is contiguous in time or in frequency with at least one other reference symbol such that the said group of reference symbols is not discontinuous.

A block of reference symbols may also be defined as a group of symbols that satisfies the stationarity conditions in time and in frequency, like those stated in document FR20010011817 "Multi-carrier signal, transmission channel tracking method for such a signal and device for its implementation". These stationarity conditions may be translated in terms of the maximum spacing of symbols making up the symbols block considered. Thus, depending on symbol propagation conditions in the telecommunication network, a first value and a second value are determined such that if the maximum spacing in a group of symbols between symbols in the group along the time axis and the maximum spacing between symbols in the group along the frequency axis, it can be considered that all symbols in the group have substantially the same propagation characteristics. Thus a symbols block may be defined by a first value and a second value corresponding to a first maximum spacing between the symbols in the block along the time axis and a second maximum spacing between the symbols along the frequency axis, respectively. These time and frequency spacings may be determined using rules like those defined in the document mentioned above.

A symbols block according to the meaning of this invention corresponds to a group of symbols satisfying one or the other of the above two definitions.

Symbols specifically inserted into a signal frame by the emitter can be used to set up such a symbols block. In such a case, the location and the value of these symbols are known to the receiver before the signal is received. Such symbols are referenced as "pilot symbols".

In one variant, it is possible to make use of symbols corresponding to transmitted useful information rather than pilot symbols specifically inserted into the useful information frame. In this case, if the receiver has already processed such an information symbol, for example by one of the demodulation methods in an OFDM system well known to those skilled in the art, the receiver has an estimate of the value taken on by said symbol and can consider said symbol as being a reference symbol. Thus, such a symbol may advantageously form part of a block of reference symbols. The value thus estimated of this reference symbol will be used.

One method according to one embodiment of this invention is applicable using a symbols block comprising either pilot symbols known to the receiver before reception, or reference symbols determined by estimating received symbols. It may also be applied using a symbols block including reference symbols corresponding to pilot symbols and also to reference symbols determined by a prior estimate.

In particular, a method according to one embodiment of this invention can be implemented based on the use of a symbols block including reference symbols known by an estimate within the framework of an iterative OFDM signal demodulation procedure, either for a conventional OFDM type of modulation or an OFDM-IOTA or an OFDM/OQAM type modulation. In such a case, during a first iteration, signal processing can be done on reception based on a block of pilot symbols. An estimate of the symbols transmitted for each received symbol in a frame can then be determined at the end of this first iteration.

Thus, some of these estimated symbols can be used during a second iteration and a new estimate of the transmitted symbols from the different antennas can be made based on both the pilot symbols and some symbols for which an estimate was obtained in the previous iteration. In this context, a method according to one embodiment of this invention can advantageously be used based on a block of estimated symbols, in other words known by estimate.

Figures 2, 3:
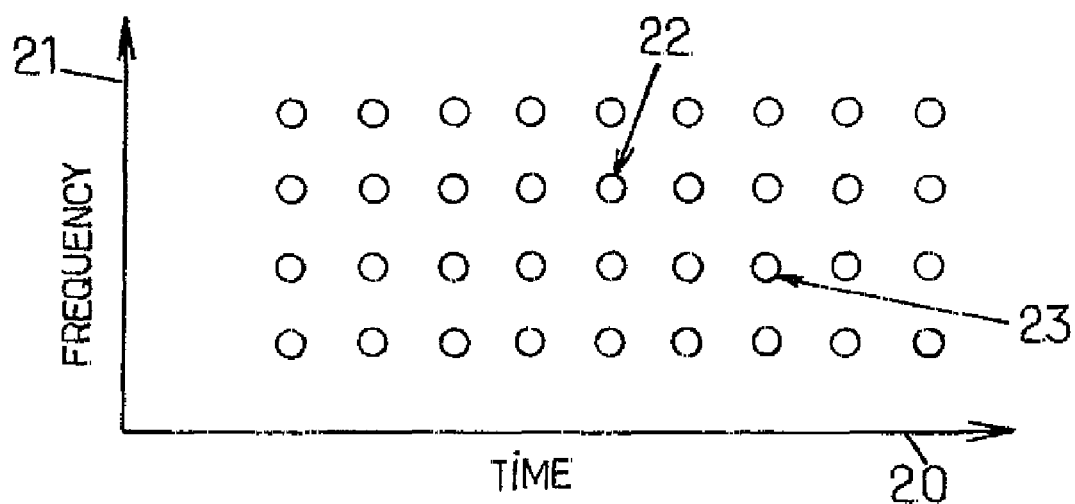
FIG. 2 shows a signal frame structure according to one embodiment of this invention.
FIG. 3 shows a reference symbols block structure in a frame such like that shown in FIG. 2.

In the case of conventional OFDM transmissions, information symbols are transmitted in parallel on several sub-channels with a structure like that shown in FIG. 2. In one frame, this structure shows a time and frequency distribution of symbols making up the transmitted signal. Consequently, each symbol $S_{i,j}$ in a frame may be identified by its position determined by two coordinates, a coordinate i on the time axis 20 and a coordinate j on the frequency axis 21, the latter corresponding to a transmission sub-channel number. Thus a symbol 22 denoted $S_{5,3}$ corresponds to the symbol time 5 and to sub-channel 3, and a symbol 23 denoted $S_{7,2}$ corresponds to symbol time 7 and to sub-channel 2.

By construction, in a conventional OFDM transmission, each symbol is orthogonal to all other symbols. The orthogonality between symbols for a conventional OFDM was defined by a zero inter-correlation between said symbols, the correlation being defined in the sense of the body of complex numbers.

In one embodiment, multiple paths are assigned to the propagation channel creating selectivity in frequency, frequency spreading creating selectivity in time. The propagation channel also varies in time.

FIG. 3 shows a symbols block 30 according to one embodiment of this invention including a block of 6 reference symbols made up of symbols $S_n$, where n varies between 1 and 6. A noise power value can be determined for each block of reference symbols thus defined in the frame considered.

Figure 4:
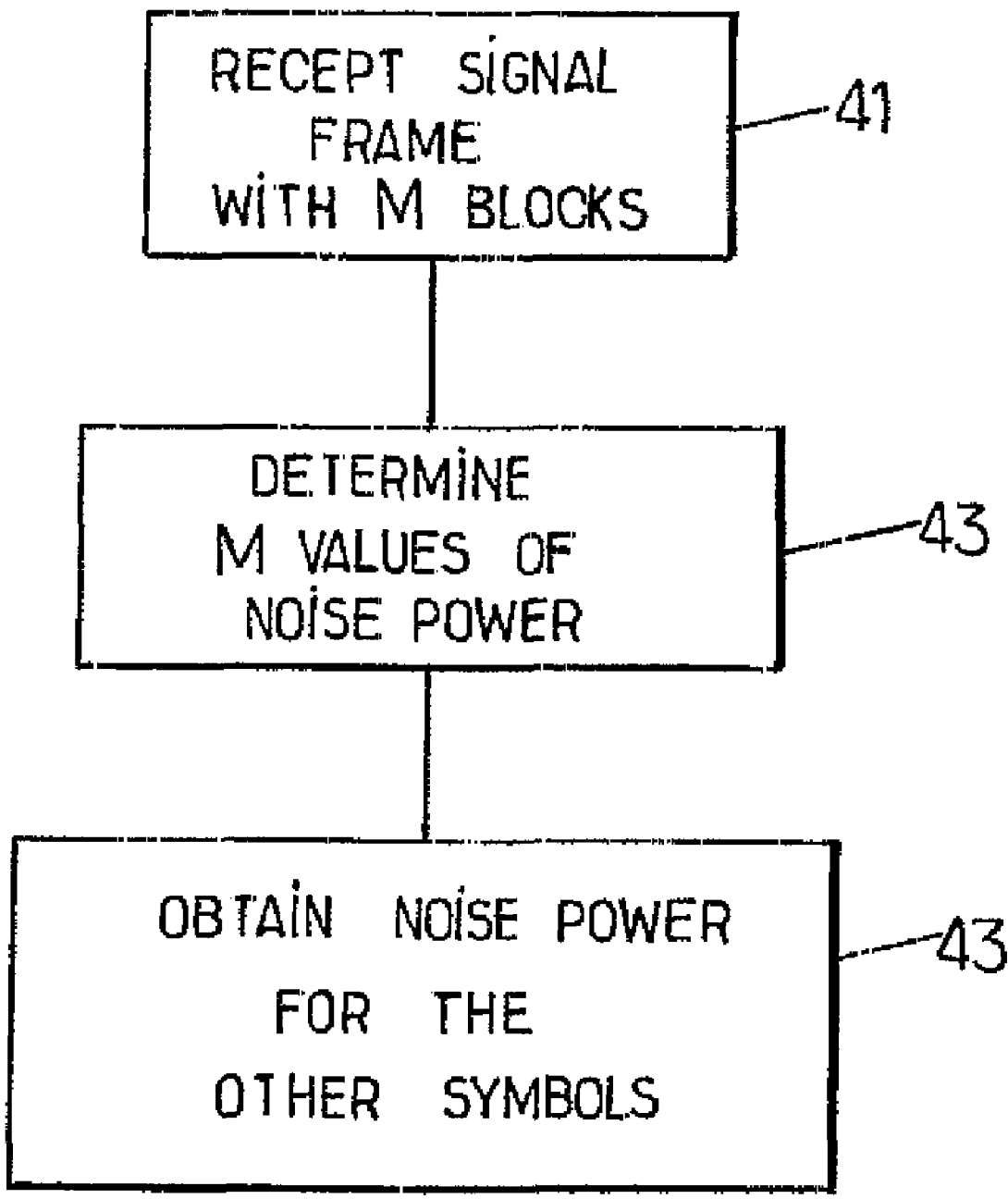
FIG. 4 shows the main steps in a reception method according to one embodiment of this invention.

FIG. 4 shows the main steps in a method according to one embodiment of this invention. In step 41, a transmitted signal frame is received. This frame comprises M reference symbol blocks. Then in step 42, M noise power values corresponding to M received reference symbol blocks are determined. Then, in step 43, noise power values for other symbols in the received frame are obtained using the M previously determined values of the noise power. This can be done by interpoling M noise power values on the frame. Note that the term "interpolation" is used in the broad sense in this description, and in particular covers interpolation of values based on the inverse of said values.

A first part describes a method according to the invention in a first variant corresponding to its application to conventional OFDM signal reception systems, and a second part describes a second variant corresponding to its application to OFDM-IOTA reception systems.

A method according to one embodiment of this invention is described in each variant, in its application to the single antenna reception system, in other words when P is equal to 1, and then in its single and multi-antenna application, where P is greater than or equal to 1.

In a first variant, an emitted signal frame structure is like that described with reference to FIGS. 2 and 3. When P is equal to 1, the signal is received by a single antenna on a propagation channel. An estimated noise power value can be obtained in a first phase, for a block of reference symbols starting from a quadratic error $\epsilon^2$ determined for N symbols in the reference symbols block and satisfying the following equation:

$$\|\gamma \cdot \vec{S} - \vec{Z}\|^2 = \epsilon^2 \tag{1}$$

The value of the estimated power for the reference symbols block can advantageously be equal to $\epsilon^2/N$, in other words it is equal to the quadratic error $\epsilon^2$ divided by the number of symbols in the reference symbols block. Such a value is then equal to an average noise power value estimated on the reference symbols block considered.

The term $\gamma$ in equation (1) is a propagation channel estimating coefficient determined for the block of reference symbols. The invention covers any means of determining such an estimating coefficient, some of which are well known to those skilled in the art.

The channel estimating coefficient may for example be determined so as to increase the value of the quadratic error $\epsilon^2$ by a threshold value for the emitted reference symbols block, between firstly reference symbols in the emitted block weighted by the channel estimating coefficient, and secondly symbols received on the antenna at the positions of the reference symbols corresponding to the emitted block.

The term $\vec{S}$ in equation (1) is a column vector with elements N of symbols $S_n$ of the emitted reference symbols block, where n is an integer index between 1 and N.

The term $\vec{Z}$ is a column vector with its elements equal to the received symbols $Z_n$ of the frame, where n is an integer index between 1 and N. $Z_n$ is the received symbol corresponding to the position of the symbol $S_n$ in the emitted reference symbols block.

Preferably, the estimating coefficient of the propagation channel γ is determined according to the following equation:

$$\gamma = \frac{\vec{S}^{*T}\vec{Z}}{\|\vec{S}\|^2} \quad (2)$$

where $\vec{S}^*$ represents the conjugate column vector of the column vector $\vec{S}$, and where $\vec{S}^{*T}$ represents the transpose of the column vector $\vec{S}^*$.

Therefore, such a channel estimating coefficient may be determined for each reference symbols block included in the frame considered.

When the radio communication network in which the received frame is transmitted is based on an OFDM-$4^n$QAM modulation represented in complex form on a real axis and an imaginary axis, a likelihood value of a bit carried on the real axis of the $4^n$QAM modulation, or on the imaginary axis of the $4^n$QAM modulation, can be calculated. In this case, for the bit corresponding to the rank k bit of one frame symbol, the symbol occupying a position in the frame with coordinates i and j, the likelihood values $VNE_{i,j,R,k}$ and $VNE_{i,j,I,k}$, can satisfy the following equations respectively:

$$VNE_{i,j,R,k} = \text{Log}\left(\sum_{a \in E_{R,k,0}} e^{\frac{(Re(\gamma^*_{i,j} z_{i,j}) - \|\gamma_{i,j}\|^2 a)^2}{2\|\gamma_{i,j}\|^2 (\varepsilon^2/N)_{i,j}}}\right) - \quad (3)$$

$$\text{Log}\left(\sum_{a \in E_{R,k,1}} e^{\frac{(Re(\gamma^*_{i,j} z_{i,j}) - \|\gamma_{i,j}\|^2 a)^2}{2\|\gamma_{i,j}\|^2 (\varepsilon^2/N)_{i,j}}}\right)$$

and $$VNE_{i,j,I,k} = \text{Log}\left(\sum_{a \in E_{I,k,0}} e^{\frac{(Re(\gamma^*_{i,j} z_{i,j}) - \|\gamma_{i,j}\|^2 a)^2}{2\|\gamma_{i,j}\|^2 (\varepsilon^2/N)_{i,j}}}\right) - \quad (4)$$

$$\text{Log}\left(\sum_{a \in E_{I,k,1}} e^{\frac{(Re(\gamma^*_{i,j} z_{i,j}) - \|\gamma_{i,j}\|^2 a)^2}{2\|\gamma_{i,j}\|^2 (\varepsilon^2/N)_{i,j}}}\right)$$

In these equations (3) and (4), the term $(\varepsilon^2/N)_{i,j}$ corresponds to a noise power value relative to reception of an emitted symbol $S_{i,j}$. Such a noise power value $(\varepsilon^2/N)_{i,j}$ may advantageously be obtained in step 43 from M estimated noise power values $\varepsilon^2/N$, and determined for the M reference symbols block in the frame considered.

The term $\gamma_{i,j}$ is a propagation channel estimating coefficient applied to the received symbol $Z_{i,j}$ corresponding to the symbol $S_{i,j}$ in the emitted frame. The coefficient $\gamma_{i,j}$ may be obtained from M estimating coefficients γ of the propagation channel previously obtained for the M reference symbol blocks of the frame considered, particularly according to equation (2). In this way, the values γ determined for the reference symbol blocks in the frame, and the values of $\gamma_{i,j}$ for the other symbols in the frame, can be deduced by interpolation calculations on the frame, like the calculations described later.

The term $E_{R,k,0}$ corresponds to a set of amplitude values a taken on by the $4^n$QAM modulation along the real axis that correspond to emitted symbols for which the bit carried by the modulation real axis with rank k is equal to 0.

The term $E_{R,k,1}$ corresponds to a set of amplitude values a taken on by the $4^n$QAM modulation along the real axis that correspond to emitted symbols for which the bit carried by the modulation real axis with rank k is equal to 1.

The term $E_{I,k,0}$ corresponds to a set of amplitude values a taken on by the $4^n$QAM modulation along the imaginary axis that correspond to emitted symbols for which the bit carried by the modulation imaginary axis with rank k is equal to 0.

The term $E_{I,k,1}$ corresponds to a set of amplitude values a taken on by the $4^n$QAM modulation along the imaginary axis that correspond to symbols emitted for which the bit carried by the modulation imaginary axis with rank k is equal to 1.

Equations (3) and (4) may advantageously be simplified and can then be written in the form of the following equations:

$$VNE_{i,j,R,k} = -\frac{\displaystyle\min_{a \in E_{R,k,0}}\left(\frac{Re(\gamma^*_{i,j} \cdot z_{i,j}) - }{\|\gamma_{i,j}\|^2 \cdot s}\right)^2}{2 \cdot \|\gamma_{i,j}\|^2 \cdot \left(\frac{\varepsilon^2}{N}\right)_{i,j}} + \frac{\displaystyle\min_{a \in E_{R,k,1}}\left(\frac{Re(\gamma^*_{ij} \cdot z_{i,j}) - }{\|\gamma_{i,j}\|^2 \cdot a}\right)^2}{2 \cdot \|\gamma_{i,j}\|^2 \cdot \left(\frac{\varepsilon^2}{N}\right)_{i,j}} \quad (5)$$

and $$VNE_{i,j,I,k} = -\frac{\displaystyle\min_{a \in E_{I,k,0}}\left(\frac{Im(\gamma^*_{i,j} \cdot z_{i,j}) - }{\|\gamma_{i,j}\|^2 \cdot a}\right)^2}{2 \cdot \|\gamma_{ij}\|^2 \cdot \left(\frac{\varepsilon^2}{N}\right)_{i,j}} + \frac{\displaystyle\min_{a \in E_{J,k,1}}\left(\frac{Im(\gamma^*_{i,j} \cdot z_{i,j}) - }{\|\gamma_{ij}\|^2 \cdot a}\right)^2}{2 \cdot \|\gamma_{ij}\|^2 \cdot \left(\frac{\varepsilon^2}{N}\right)_{i,j}} \quad (6)$$

Within the context of reception of a conventional OFDM signal, in one embodiment of this invention, the reception system may include one or several signal reception antennas. The following sections can be applicable to a single antenna system for P equal to 1, or for a multi-antenna system for P greater than 1.

In such a system, with single or multiple antennas, an estimated noise power value can be obtained in step 42 for a reference symbols block, starting from a quadratic error $\varepsilon^2$ determined for N symbols in the reference symbols block and satisfying the following equation:

$$\|[Z]\vec{\beta} - \vec{S}\|^2 = \varepsilon^2 \quad (7)$$

This equation (7) can then be used to deduce an estimated noise power value for the reference symbols block. Such a noise power value may be equal to $\varepsilon^2/N$, in other words equal to the quadratic error divided by the number of symbols in the reference symbols block.

In this equation (7), the term $\vec{S}$ is a column vector with elements N of symbols $S_n$ in the reference symbols block, where n is an integer index between 1 and N.

The term $[Z]$ is a matrix with its elements equal to the received symbols $Z_{n,p}$ in the frame, where n represents the matrix row index, n is an integer index between 1 and N, and p represents the column index of the matrix, where p is an integer index between 1 and P. The term $Z_{n,p}$ denotes the symbol received on the $p^{th}$ antenna corresponding to the position of symbol $S_n$ in the emitted reference symbols block.

$\vec{\beta}$ is a column vector with P weighting coefficient elements $\beta_p$, where p varies between 1 and P, where $\beta_p$ is the weighting coefficient corresponding to the $p^{th}$ antenna and that can be applied to all symbols in the reference symbols block considered. These weighting coefficients $\beta_p$ are determined with the purpose of generating a high performance composite signal, in other words close to the emitted signal.

This invention covers any method of obtaining such weighting coefficients designed to weight the symbols in the received reference symbol blocks, so as to generate a processed signal in reception comprising symbols closer to the corresponding emitted symbols than the received symbols.

In one embodiment of this invention, the P coefficients are determined at frame level relative to a block of emitted reference symbols considered. The P coefficients are then associated with the reference symbol blocks received on the corresponding P antennas and that correspond to the emitted reference symbols block. Preferably, these P weighting coefficients are determined so as to increase the value of the quadratic error $\epsilon^2$ satisfying equation (7) for the emitted reference symbols block by a threshold value, firstly between reference symbols in the emitted block considered, and secondly symbols obtained from symbols received on each of the P antennas at the positions of the reference symbols corresponding to the emitted block, weighted by the corresponding associated weighting coefficients.

In this context, a symbol $Z'n$ of the processed signal can be written from the corresponding symbols $Z_{n,p}$ received on the P antennas corresponding to the symbol $Sn$ in the emitted reference symbols block, in the form of the following equation:

$$Z'_n = \sum_{p=1,P} \beta_p z_{n,p} \quad (7')$$

The column vector of the weighting coefficients $\vec{\beta}$ then preferably satisfies the following equation:

$$\vec{\beta} = [[z]^{*T}[z]]^{-1}[z]^{*T}\vec{S} \quad (8)$$

where $[Z]^*$ represents the conjugate matrix of matrix $[Z]$, and where $[Z]^{*T}$ represents the transpose of matrix $[Z]^*$.

When the telecommunication network is based on an OFDM-$4^n$QAM modulation represented in complex form on a real axis and an imaginary axis, a likelihood value of a bit carried by the real axis of the $4^n$QAM modulation and the imaginary axis of the $4^n$QAM modulation respectively, and with rank k of a symbol in the frame can be calculated, the symbol occupying a position in the frame with coordinates i and j, the likelihood value $VNE_{i,j,R,k}$ and $VNE_{i,j,I,k}$ satisfies the following equations respectively:

$$VNE_{i,j,R,k} = \text{Log}\left(\sum_{a \in E_{R,k,0}} e^{-\frac{(\text{Re}(\sum_{p=1,P}\beta_{i,j,p} \cdot z_{i,j,p})-a)^2}{2\left(\frac{\epsilon^2}{N}\right)_{i,j}}}\right) - \quad (9)$$

$$\text{Log}\left(\sum_{a \in E_{R,k,1}} e^{-\frac{(\text{Re}(\sum_{p=1,P}\beta_{i,j,p} \cdot z_{i,j,p})-a)^2}{2\left(\frac{\epsilon^2}{N}\right)_{i,j}}}\right)$$

and:

$$VNE_{i,j,I,k} = \text{Log}\left(\sum_{a \in E_{J,k,0}} e^{-\frac{(\text{Im}(\sum_{p=1,P}\beta_{i,j,p} \cdot z_{i,j,p})-a)^2}{2\left(\frac{\epsilon^2}{N}\right)_{i,j}}}\right) - \quad (10)$$

$$\text{Log}\left(\sum_{a \in E_{I,k,1}} e^{-\frac{(\text{Im}(\sum_{p=1,P}\beta_{i,j,p} \cdot z_{i,j,p})-a)^2}{2\left(\frac{\epsilon^2}{N}\right)_{i,j}}}\right)$$

The term $(\epsilon^2/N)_{i,j}$ in the equation corresponds to a noise power value on reception of an emitted symbol $S_{i,j}$. This noise power value $(\epsilon^2/N)_{i,j}$ is advantageously obtained in step 43 from M estimated noise power values $\epsilon^2/N$ determined for the M reference symbol blocks respectively, the term $\epsilon^2$ being determined in this case using equation (7). N is a number greater than 0x equal to P+1 and $\beta_{i,j,p}$ corresponds to a weighting coefficient applied to the symbol $Z_{i,j,p}$, received on the $p_{th}$ antenna and corresponding to the symbol $S_{i,j}$ in the emitted frame. Such a coefficient is obtained for the symbols $S_{i,j}$ in the frame other than the symbols in the reference symbols block. These weighting coefficients $\beta_{i,j,p}$ may advantageously be obtained from coefficients $\beta_p$ like those described previously, by an interpolation calculation like those described in a subsequent section.

Let $Z'_{i,j}$ be the symbols of a composite processed signal corresponding to the positions with coordinates i and j like those defined above, particularly with reference to FIG. 2. It is then possible to obtain a composite signal according to one embodiment of this invention using the following equation:

$$Z'_{i,j} = \sum_{p=1}^{P} \beta_{i,j,p} \cdot Z_{i,j,p}$$

The other terms in these two final equations have previously been defined with reference to equations (3) and (4).

Equations (9) and (10) may be approximated by the following equations respectively:

$$VNE_{i,j,R,k} = -\frac{\underset{a \in E_{R,k,0}}{\text{Min}}\left[\left(\text{Re}\left(\sum_{p=1,P}\beta_{i,j,p} \cdot z_{i,j,p}\right) - a\right)^2\right]}{2 \cdot \left(\frac{\epsilon^2}{N}\right)_{i,j}} + \quad (11)$$

$$\frac{\underset{a \in E_{R,k,1}}{\text{Min}}\left[\left(\text{Re}\left(\sum_{p=1,P}\beta_{i,j,p} \cdot z_{i,j,p}\right) - a\right)^2\right]}{2 \cdot \left(\frac{\epsilon^2}{N}\right)_{i,j}}$$

and:

$$VNE_{i,j,I,k} = -\frac{\underset{a \in E_{I,k,0}}{\text{Min}}\left[\left(\text{Im}\left(\sum_{p=1,P}\beta_{i,j,p} \cdot z_{i,j,p}\right) - a\right)^2\right]}{2 \cdot \left(\frac{\epsilon^2}{N}\right)_{i,j}} + \quad (12)$$

$$\frac{\underset{a \in E_{J,k,1}}{\text{Min}}\left[\left(\text{Im}\left(\sum_{p=1,P}\beta_{i,j,p} \cdot z_{i,j,p}\right) - a\right)^2\right]}{2 \cdot \left(\frac{\epsilon^2}{N}\right)_{i,j}}$$

In a second described variant of a method according to one embodiment of this invention, the signal received by the reception unit 15 is an OFDM-IOTA or an OFDM/OQAM type multi-carrier signal. The following sections present modifications to be made to the equations described previously within the framework of a transmission network based on such a modulation.

Figure 5:
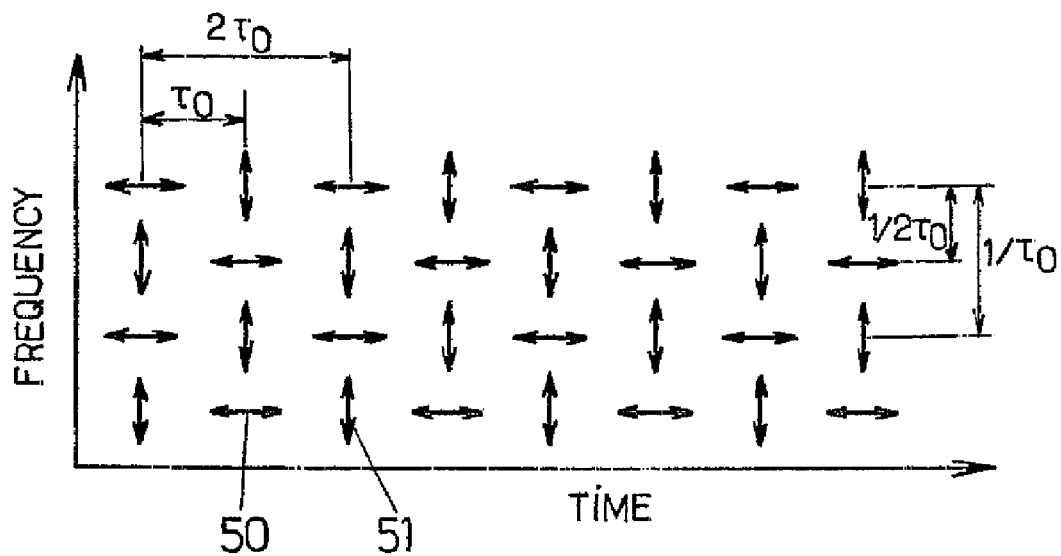
FIG. 5 shows a signal frame structure according to another embodiment of this invention.

In this type of modulation, the symbols are transmitted using the structure described in FIG. 5. In this case, the transmitted symbols are single dimensional. They are alternately pure real and pure imaginary, both along the time axis and along the frequency axis as is the case for the symbol reference 50 and the symbol reference 51 respectively. Each symbol is orthogonal to all other symbols. Within the framework of an OFDM-IOTA or OFDM/OQAM modulation, two symbols are orthogonal when the real part of their intercorrelation is zero.

Figure 6:
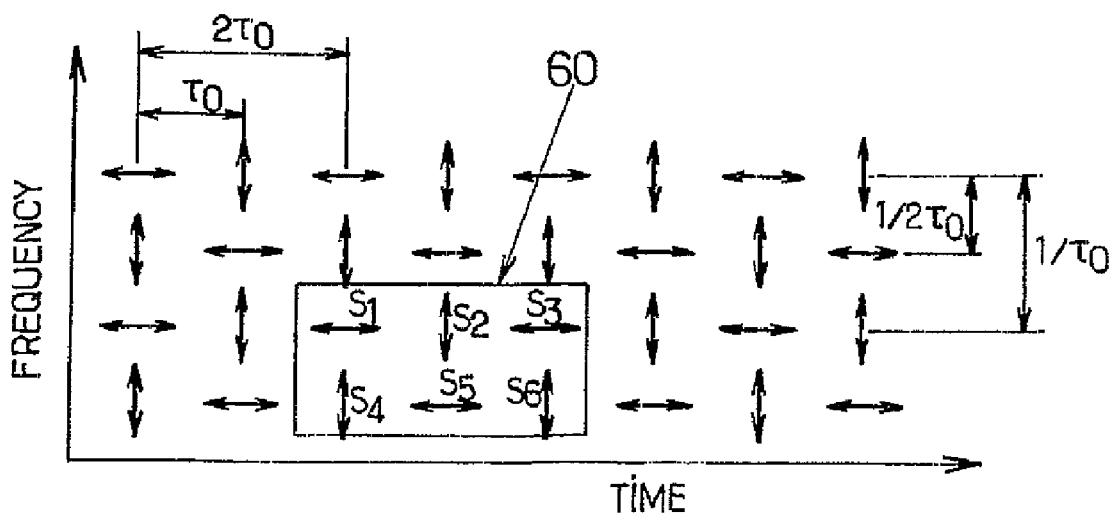
FIG. 6 shows a reference symbols block structure in a frame like that shown in FIG. 5.

In FIGS. 5 and 6, the vertical double arrows represent pure real symbols and the horizontal double arrows represent pure imaginary symbols. In these figures, $\tau_0$ represents the spacing between two symbols in the frame along the time axis.

FIG. 6 shows a block of reference symbols 60 according to one embodiment of this invention in a frame transmitted according to such a modulation. This reference symbols block 60 comprises six symbols $S_n$, where n varies from 1 to 6. In the case shown herein, the stationarity conditions are satisfied for a spacing along the time axis equal to two inter-symbol spacings and for a spacing along the frequency axis equal to one inter-symbol spacing.

In the general case of a reception system comprising P antennas, where P is greater than or equal to 1, the received symbol $Z_{i,j,p}$ corresponds to reception of the symbol $S_{i,j}$ by the antenna p. In one embodiment of this invention corresponding to an OFDM/IOTA or OFDM/OQAM type transmission, the received symbols $Z_{i,j,p}$ are transformed into $ZZ_{i,j,p}$ symbols according to a determined rule.

Due to the alternation of emitted symbols that are either pure reals or pure imaginaries, this rule consists of multiplying the symbols received by the complex number $-j$ if they correspond to pure imaginary emitted symbols $S_{i,j}$, and not to transform the received symbols corresponding to pure real emitted symbols $S_{i,j}$.

In the example described below, this signal is received by a single antenna on a propagation channel, in other words P is equal to 1.

In step 42, an estimated noise power value can then be determined relative to a reference symbols block, starting from a quadratic error $\epsilon^2$ determined according to N symbols in the reference symbols block considered and satisfying the following equation:

$$\|Re((1/\gamma)\overrightarrow{ZZ}) - \overrightarrow{SS}\| = \epsilon^2 \quad (13)$$

Under these conditions, the estimated power value for the reference symbols block considered may then be equal to $\epsilon^2/N$, in other words equal to the quadratic error $\epsilon^2$ divided by the number of symbols in the reference symbols block.

$\gamma$ is a propagation channel estimating coefficient determined for the reference symbols block considered, using any method for determining such a coefficient.

For example, the channel estimating coefficient may be determined so as to increase the quadratic error value $\epsilon^2$ for the emitted reference symbols block by a threshold value, firstly between the reference symbols in the emitted block weighted by said channel estimating coefficient, and secondly symbols received on the antenna at the positions of the reference symbols corresponding to the emitted block.

The term $\overrightarrow{SS}$ is a column vector with N symbol elements $SS_n$ deduced from the reference symbols $S_n$ in the emitted symbols block, where n is an integer index between 1 and N. More precisely, $SS_n$ may be obtained by transformation of the reference symbol $S_n$ in the emitted reference symbols block. This transformation may be defined according to the following two rules:

$SS_n = S_n$; it the reference symbol $S_n$ is a pure real;

$SS_n = -j \cdot S_n$; if the reference symbol $S_n$ is a pure imaginary, where j is the square root of $-1$.

The term $\overrightarrow{ZZ}$ is then a column vector with its elements being the symbols $ZZ_n$ in the received frame, where n is an integer index between 1 and N, where $ZZ_n$ is also obtained by transformation of the received symbol $Z_n$ corresponding to the position of the symbol $S_n$ in the emitted reference symbols block. This transformation may be defined according to the following two rules:

$ZZ_n = Z_n$; if the corresponding transmitted symbol $S_{i,j}$ is a pure real;

$ZZ_n = -j \cdot Z_n$; if the corresponding transmitted symbol $S_{i,j}$ is a pure imaginary.

In such an embodiment of this invention, the estimating coefficient of the propagation channel $\gamma$ may for example satisfy the following equation:

$$\begin{bmatrix} Re(1/\gamma) \\ Im(1/\gamma) \end{bmatrix} = M \cdot \begin{bmatrix} Re(\overrightarrow{ZZ}^{*T} \cdot \overrightarrow{SS}) \\ Im(\overrightarrow{ZZ}^{*T} \cdot \overrightarrow{SS}) \end{bmatrix} \quad (14)$$

where $\overrightarrow{ZZ}^*$ represents the conjugate column vector of the column vector $\overrightarrow{ZZ}$, and where $\overrightarrow{ZZ}^{*T}$ represents the transpose of the column vector $\overrightarrow{ZZ}^*$, where M is a matrix defined by:

$$M = \begin{bmatrix} \|Re(\overrightarrow{ZZ})\|^2 & -Re(\overrightarrow{ZZ})^T \cdot Im(\overrightarrow{ZZ}) \\ -Im(\overrightarrow{ZZ})^T \cdot Re(\overrightarrow{ZZ}) & \|Im(\overrightarrow{ZZ})\|^2 \end{bmatrix}^{-1} \quad (15)$$

where $\overrightarrow{ZZ}^T$ represents the transpose of the column vector $\overrightarrow{ZZ}$.

In this second variant of this invention, when the telecommunication network is based on an OFDM/IOTA or OFDM/OQAM system using symbols modulated with a $2^n$ASK modulation, a likelihood value of a bit carried by the $2^n$ASK modulation can be calculated. Thus, for the bit corresponding to the rank k bit in a frame symbol, the symbol occupying a position in the frame with coordinates i and j, the likelihood value $VNE_{i,j,k}$ can then satisfy the following equation:

$$VNE_{i,j,k} = Log\left(\sum_{a \in E_{k,0}} e^{-\frac{(Re(\gamma_{i,j}^* \cdot zz_{i,j}) - \|\gamma_{i,j}\|^2 \cdot a)^2}{2 \cdot \|\gamma_{i,j}\|^2 \cdot \left(\frac{\epsilon^2}{N}\right)_{i,j}}}\right) - \quad (16)$$

$$\text{Log}\left(\sum_{a\in E_{k,1}} e^{-\frac{(\text{Re}(\gamma_{i,j}^*\cdot zz_{i,j})-\|\gamma_{i,j}\|^2\cdot a)^2}{2\cdot\|\gamma_{i,j}\|^2\cdot\left(\frac{\varepsilon^2}{N}\right)_{i,j}}}\right)$$

In this equation (16), the term $(\epsilon^2/N)_{i,j}$ corresponds to a noise power value on reception of an emitted symbol $S_{i,j}$. This noise power value $(\epsilon^2/N)_{i,j}$ may be obtained in step 43 from M estimated noise power values $\epsilon^2/N$ respectively determined in step 42 for the M corresponding reference symbol blocks and according to equation (13). N is a number greater than or equal to 2·P+1 and $\gamma_{i,j}$ is a propagation channel estimating coefficient applied to the received symbol $Z_{i,j}$ corresponding to symbol $S_{i,j}$ in the emitted frame. This estimating coefficient $\gamma_{i,j}$ may advantageously be obtained from M estimating coefficients $\gamma$ of the propagation channel obtained for the M reference symbol blocks according to equation (14). This can be done by making an interpolation calculation like those described in a subsequent section.

The term $E_{k,0}$ corresponds to a set of amplitude values a taken on by the $2^n$ASK modulation that correspond to emitted symbols for which the bit carried by the single dimensional axis (real or imaginary) of the rank k modulation is equal to the value 0.

The term $E_{k,1}$ corresponds to a set of amplitude values a taken on by the $2^n$ASK modulation that correspond to emitted symbols for which the bit carried by the single dimensional axis (real or imaginary) of the rank k modulation is equal to the value 1.

Equation (16) may be approximated by the following equation:

$$VNE_{i,j,k} = \frac{\underset{a\in E_{k,0}}{\text{Min}}\,(\text{Re}(\gamma_{i,j}^*\cdot zz_{i,j})-\|\gamma_{i,j}\|^2\cdot a)^2}{2\cdot\|\gamma_{i,j}\|^2\cdot\left(\frac{\varepsilon^2}{N}\right)_{i,j}} + \frac{\underset{a\in E_{k,1}}{\text{Min}}\,(\text{Re}(\gamma_{i,j}^*\cdot zz_{i,j})-\|\gamma_{i,j}\|^2\cdot a)^2}{2\cdot\|\gamma_{i,j}\|^2\cdot\left(\frac{\varepsilon^2}{N}\right)_{i,j}} \quad (17)$$

In this second variant, the OFDM/IOTA or OFDM/OQAM signal can also be received more generally on an antenna or a plurality of antennas. Therefore, the following sections describe an example application of the second variant, where P is greater than or equal to 1.

In this context, in step 42, an estimated noise power value can be determined for a reference symbols block starting from a quadratic error $\epsilon^2$ determined for N symbols in the reference symbols block and satisfying the following equation:

$$\left\|\text{Re}([zz]\cdot\vec{\beta})-\vec{SS}\right\|^2 = \varepsilon^2 \quad (18)$$

Thus, this equation (18) can be used to deduce a noise power value estimated for the reference symbols block. Such a noise power value may be equal to $\epsilon^2/N$, in other words equal to the quadratic error divided by the number of symbols in the reference symbols block.

The term $\vec{SS}$ is a column vector with N symbol elements $SS_n$ deduced from the reference symbols $S_n$ in the emitted symbols block considered, where n is an integer index between 1 and N. The term $SS_n$ is obtained by transformation of the reference symbol $S_n$ in the emitted reference symbols block, the transformation being defined according to the following two rules:

$SS_n = S_n$; if the reference symbol $S_n$ is a pure real;

$SS_n = -j\cdot S_n$; if the reference symbol $S_n$ is a pure imaginary, where j is the square root of −1.

The term [ZZ] is a matrix with its elements being symbols $ZZ_{n,p}$ in the received frame, where n represents the row index of the matrix, n is an integer index between 1 and N, and p represents the column index of the matrix and is an integer index between 1 and P, where $ZZ_{n,p}$ is obtained by transformation of the symbol $Z_{n,p}$ received on the $p^{th}$ antenna and corresponding to the position of the symbol $S_n$ in the emitted reference symbols block. This transformation may be defined according to the following two rules:

$ZZ_n = Z_n$; if the corresponding transmitted symbol $S_{i,j}$ is a pure real;

$ZZ_n = -j\cdot Z_n$; if the corresponding transmitted symbol $S_{i,j}$ is a pure imaginary.

$\vec{\beta}$ is a column vector with P weighting coefficient elements βp, for p varying between 1 and P, βp being the weighting coefficient corresponding to the $p^{th}$ antenna and that can be applicable to all symbols in the reference symbols block considered. These weighting coefficients βp are determined so as to generate a high performance composite signal, in other words close to the emitted signal in the case of a multi-antenna reception system.

This invention covers any method of obtaining such weighting coefficients designed to weight symbols in received reference symbol blocks so as to generate a processed signal in reception including symbols closer to the corresponding emitted symbols than the received symbols.

In one embodiment of this invention, the P coefficients are determined at frame level for an emitted reference symbols block considered. The P coefficients are then associated with reference symbol blocks that are received on the P antennas corresponding to the emitted reference symbols block, respectively. Preferably, these P weighting coefficients are determined so as to increase the quadratic error value $\epsilon^2$ satisfying equation (18) for the emitted reference symbols block by a threshold value, firstly between the reference symbols in the emitted block considered and secondly the symbols obtained from the symbols received on each of the P antennas at the positions of the reference symbols corresponding to the emitted block, weighted by the associated weighting coefficients.

In this context, a symbol $ZZ'_n$ of the signal processed from the corresponding symbols $ZZ_{n,p}$ received on the P antennas corresponding to the symbol $S_n$ of the emitted reference symbols block can be written in the form of the following equation:

$$ZZ'_n = \sum_{p=1,P} \beta_p ZZ_{n,p} \quad (18')$$

The column vector of the weighting coefficients $\vec{\beta}$ can then satisfy the following equation:

$$\begin{bmatrix} \text{Re}(\vec{\beta}) \\ \text{Im}(\vec{\beta}) \end{bmatrix} = M \cdot \begin{bmatrix} \text{Re}([ZZ]^{*T} \cdot \vec{SS}) \\ \text{Im}([ZZ]^{*T} \cdot \vec{SS}) \end{bmatrix} \quad (19)$$

where M is a matrix defined by blocks according to the following equation:

$$M = \begin{bmatrix} \|\text{Re}([ZZ])\|^2 & -\text{Re}([ZZ])^T \cdot \text{Im}([ZZ]) \\ -\text{Im}([ZZ]^T) \cdot \text{Re}([ZZ]) & \|\text{Im}([ZZ])\|^2 \end{bmatrix}^{-1} \quad (20)$$

A likelihood value of a bit carried by the $2^n$ASK modulation can be calculated in this context of a transmission using an OFDM/IOTA or OFDM/OQAM type modulation using symbols modulated with a $2^n$ASK modulation. For the bit corresponding to the rank k bit in a symbol in the frame, said symbol occupying a position in the frame with coordinates i and j, the likelihood value $VNE_{i,j,k}$ can satisfy the following equation:

$$VNE_{i,j,k} = \text{Log}\left(\sum_{a \in E_{k,0}} e^{-\frac{\left(\text{Re}\left(\sum_{p=1,P} \beta_{i,j,p} \cdot zz_{1,j,p}\right) - a\right)^2}{2\left(\frac{\varepsilon^2}{N}\right)_{i,j}}}\right) - $$

$$\text{Log}\left(\sum_{a \in E_{k,1}} e^{-\frac{\left(\text{Re}\left(\sum_{p=1,P} \beta_{i,j,p} \cdot zz_{1,j,p}\right) - a\right)^2}{2\left(\frac{\varepsilon^2}{N}\right)_{i,j}}}\right) \quad (21)$$

In this equation (21), $(\epsilon^2/N)_{i,j}$ corresponds to a noise power value for reception of an emitted symbol $S_{i,j}$, this noise power value $(\epsilon^2/N)_{i,j}$ being obtained in step 43 from M estimated noise power values $\epsilon^2/N$ determined for the corresponding M reference symbol blocks in step 42. N is a number greater than or equal to 2·P+1 and $\beta_{i,j,p}$ is the weighting coefficient, preferably as defined above, applied to the symbol $Z_{i,j,p}$, received on the $p^{th}$ antenna and corresponding to the symbol $S_{i,j}$ in the emitted frame, these coefficients possibly being obtained from the coefficients $\beta_p$ obtained according to equation (19) for each reference symbols block, by an interpolation calculation like those described in a subsequent section. The term $E_{k,0}$ corresponds to a set of amplitude values a taken on by the $2^n$ASK modulation that correspond to emitted symbols for which the rank k bit is equal to the value 0 and the term $E_{k,1}$ corresponds to a set of amplitude values a taken by the $2^n$ASK modulation that correspond to emitted symbols for which the rank k bit is equal to 1.

Equation (21) can be approximated by the following equation:

$$VNE_{i,j,k} = \frac{\underset{a \in E_{k,0}}{\text{Min}}\left[\left(\text{Re}\left(\sum_{p=1,P} \beta_{i,j,p} \cdot zz_{1,j,p}\right) - a\right)^2\right]}{2 \cdot \left(\frac{\varepsilon^2}{N}\right)_{i,j}} + \quad (22)$$

-continued $$\frac{\underset{a \in E_{k,1}}{\text{Min}}\left[\left(\text{Im}\left(\sum_{p=1,P} \beta_{i,j,p} \cdot zz_{1,j,p}\right) - a\right)^2\right]}{2 \cdot \left(\frac{\varepsilon^2}{N}\right)_{i,j}}$$

Figure 7:
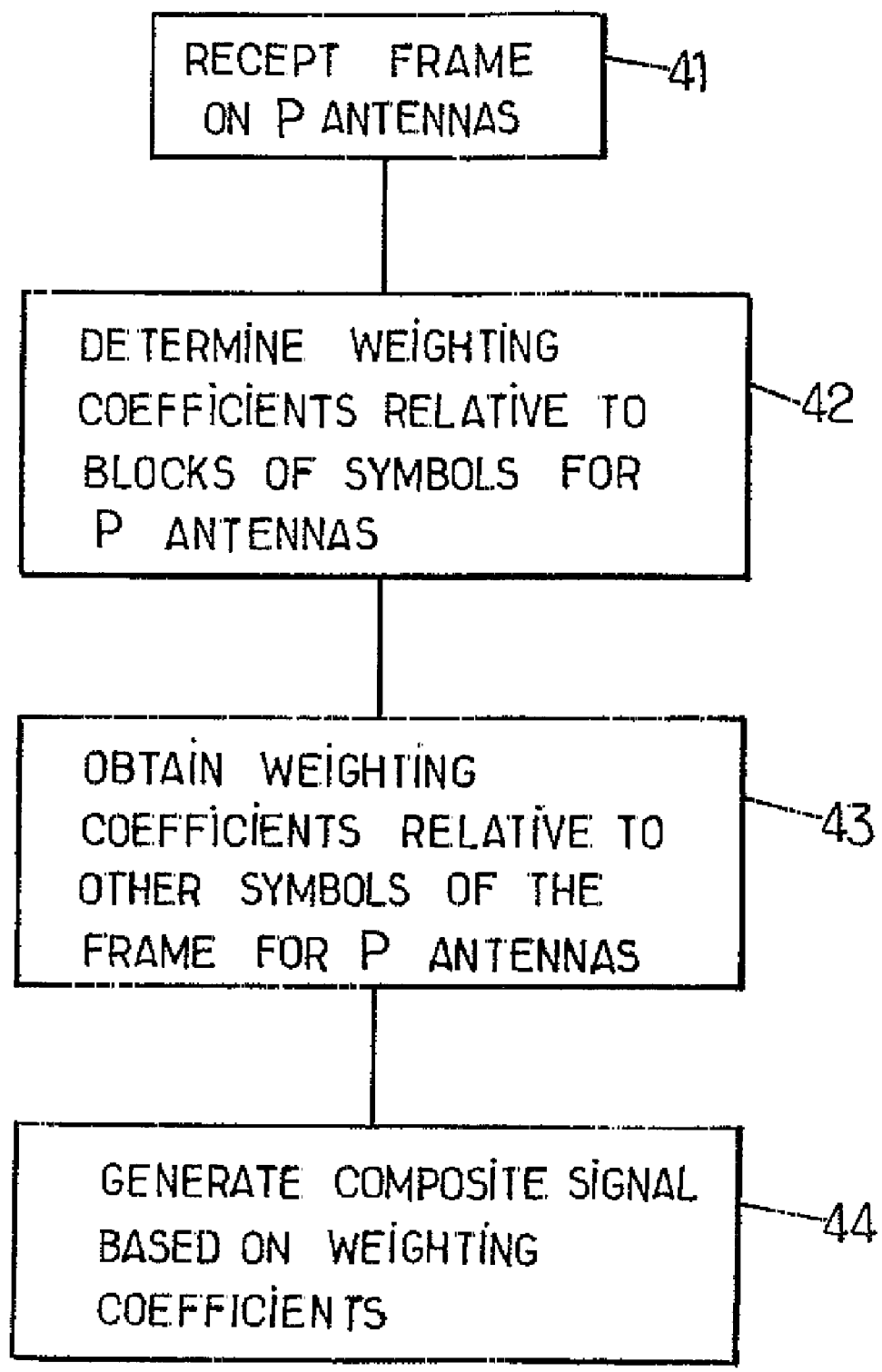
FIG. 7 shows details of the steps in a method according to one embodiment of this invention.

FIG. 7 shows details of steps of a method according to one embodiment of this invention used to obtain weighting coefficients $\beta_{i,j,p}$ like those previously defined.

In this embodiment, the objective is also to determine weighting coefficients $\beta_{i,j,p}$ for signals received on the different antennas p, denoted $Z_{i,j,p}$ corresponding to emitted symbols $S_{i,j}$, where p is an integer between 1 and P, and i and j are integers determining the position of symbol $S_{i,j}$ in the frame. In this embodiment, the emitted signal is reconstituted on reception in the form of a composite signal by summating symbols received by the antennas, corresponding to the same position in the signal frame, each being multiplied by the determined weighting coefficient. Therefore, this type of method can reduce the signal/noise ratio for the composite signal obtained after processing in comparison with the signal/noise for a signal obtained by other methods such as an antenna diversity method, particularly in the case in which noise affecting signals received on the different antennas are correlated. Thus, in particular such a method can reduce the impact of interferences.

A reception method according to one embodiment of this invention proposes to determine these weighting coefficients based on at least two symbol blocks included in a signal frame, the symbols making up each of these blocks being known to the receiver.

In step 71, a frame is received on P antennas. This frame comprises at least two blocks of receiver reference symbols, each of these blocks satisfying determined stationarity conditions as presented in a previous section. Then in step 72, a weighting coefficient is determined for each antenna p, for each of the symbol blocks. The same weighting coefficient is then applied to all symbols in the same reference symbols block received on the same antenna. Refer to equations (7') and (18') for this aspect.

This step is preferably carried out so as to reduce the quadratic error $\epsilon^2$ satisfying one of the previous equations depending on the application context, in other words either equation (1) or (7) in the first described variant of the invention, or equation (13) or (18) in the second described variant of the invention.

Thus, P weighting coefficients can be determined for each of the reference symbol blocks in the frame, one for each signal output from each antenna corresponding to the reference symbols block considered, such that the quadratic error between the reference symbols block emitted and a linear combination of the signal blocks received on each of the P antennas corresponding to the symbols in the reference symbols block considered, the coefficients of the linear combination being the P weighting coefficients required, either increased by a threshold value (or such an error might reduce the threshold value). Preferably, these weighting coefficients are determined so as to minimise such a quadratic error. Among the different values that can be determined for these weighting coefficients, the value that gives the lowest error will be used in preference. In such a context, the threshold value may be determined as a function of the different error values thus obtained. For example, the threshold value may correspond to the value of the lowest error obtained among several error values obtained by varying the weighting coefficients.

In step 73, the weighting coefficients determined in step 72 are used to determine weighting coefficients for all other symbols in the frame on all the P antennas, for example by applying an interpolation calculation like those described below. Then in step 74, a composite signal frame is generated as a function of the weighting coefficients thus obtained and the P signal frames received on each antenna p. By reiterating these steps on each frame, it is possible to generate a composite signal according to one embodiment of the invention.

This invention covers all methods that can be used to obtain such weighting coefficients for each antenna and for each symbol in a frame, other than those for the symbol blocks considered, as a function of the weighting coefficients already obtained for these blocks.

In one embodiment of this invention, these different values or coefficients can be determined in a first phase for the reference symbol blocks in the frame, and then in a second phase for the other symbols in the frame, equally well for noise power values, and for channel estimating coefficients, and for weighting coefficients. Preferably, this second phase is done starting from the results obtained in the first phase. The values or coefficients obtained for the different reference symbol blocks in a frame can be used to deduce the values or coefficients applicable to other symbols in the frame. To achieve this, it may be advantageous to perform a calculation to interpolate values or coefficients determined on the blocks in the frame.

For example, the second phase may be done by interpoling values or coefficients obtained in relation to symbol blocks. Note that the term "interpolation" is used in the broad sense in this description, and in particular covers interpolation of values based on the inverse of said values.

Thus, such an interpolation calculation may use a conventional type interpolation applied directly to the values of the weighting coefficients for symbol blocks, for example such as a linear interpolation or an interpolation making use of Fourier Transforms. Preferably, an interpolation step will keep values produced in the first phase for symbols in the reference symbols block, for symbols in reference symbol blocks considered in the frame.

Document FR20010011817 "Multi-carrier signal, method for tracking a transmission channel of such a signal and device for its use" describes such a method of interpoling values. These interpolation methods may also advantageously be used to obtain estimated noise power values for all other symbols in the frame, in step 43.

For example for each antenna, it would be possible firstly to interpolate along the time axis, in other words along all horizontal rows in the frame on which at least one symbol belongs to a symbols block for which a channel estimating coefficient or a weighting coefficient or a noise power value has already been determined. Interpolation is then done along the frequency axis, in other words using all the columns in the frame on which a channel estimating coefficient or a weighting coefficient or a noise power value has been determined, in other words in this particular case all columns in the frame.

In one variant, an interpolation calculation can be made starting from the inverse of noise power values or weighting coefficients or estimating coefficients already obtained on the reference symbol blocks.

The invention claimed is:

1. A signal reception method in a telecommunication network comprising reception of a number P of signals on P corresponding antennas, where P is an integer greater than or equal to 1;
    wherein the received signals correspond to a multi-carrier signal transmitted in the form of successive frames comprising symbols occupying corresponding positions distributed along a time axis and along a frequency axis;
    wherein one frame comprising M blocks each with at least N reference symbols, the reference symbols in each of the blocks satisfying a first maximum spacing between each other along the time axis and a second maximum spacing between each other along the frequency axis, less than a first value and a second value respectively, and M being an integer number equal to at least two,
    the process being based on an estimate of the noise power, including the following steps:
    /a/ determine M estimated noise power values at frame level, each related to one of the M emitted reference symbol blocks;
    /b/ obtain values of the estimated noise power relative to other symbols in the frame by interpoling said M estimated noise power values.

2. The method according to claim 1, wherein step /b/ includes an interpolation calculation based on the inverse of estimated noise power values determined in step /a/.

3. The reception method according to claim 1, wherein in step /a/, the block of emitted symbols comprises reference pilot symbols known to the receiver before reception, and/or symbols obtained by a prior estimate of said reference symbols.

4. The signal reception method according to claim 1, wherein when P is equal to 1, the signal being received by an antenna on a determined propagation channel, an estimated noise power value is obtained in step /a/, for a block of reference symbols starting from a quadratic error $\epsilon^2$ determined for N symbols in the reference symbols block, where N is equal to not more than 2, and satisfying the following equation:

$$\|\gamma \cdot \vec{S} - \vec{Z}\|^2 = \epsilon^2$$

the estimated power value for said reference symbols block being equal to $\epsilon^2/N$, where $\epsilon^2/N$ is the quadratic error $\epsilon^2$ divided by the number of symbols in the reference symbols block;
where $\gamma$ is a coefficient for estimating said propagation channel determined for said block of reference symbols;
the channel estimating coefficient being determined so as said value of the quadratic error $\epsilon^2$ is lower than a threshold value for the emitted reference symbols block, between firstly reference symbols in said emitted block weighted by said channel estimating coefficient, and secondly symbols received on the antenna at the positions of the reference symbols corresponding to said emitted block;
where $\vec{S}$ is a column vector with elements N of symbols $S_n$ of said emitted reference symbols block, where n is an integer index between 1 and N; and $\vec{Z}$ a column vector with its elements equal to the received symbols $Z_n$ of the frame, where n is an integer index between 1 and N, $Z_n$ being the received symbol corresponding to the position of the symbol $S_n$ in the emitted reference symbols block.

5. The reception method according to claim 4, wherein which the propagation channel estimating coefficient γ satisfies the following equation:

$$\gamma = \frac{\vec{S}^{*T}\vec{Z}}{\|\vec{S}\|^2}$$

where $\vec{S}^*$ represents the conjugate column vector of the column vector $\vec{S}$, and where $\vec{S}^{*T}$ represents the transpose of the column vector $\vec{S}^*$.

6. The signal reception method according to claim 4, wherein the telecommunication network is based on an OFDM -$4^n$PQAM modulation represented in complex form on a real axis and an imaginary axis;
   wherein said method also includes a step consisting of calculating a likelihood value of a bit carried on the real axis of the $4^n$QAM modulation, or on the imaginary axis of the $4^n$QAM modulation, for the rank k of a symbol in the frame, said symbol occupying a position in the frame with coordinates i and j, and said likelihood values $VNE_{i,j,R,k}$ and $VNE_{i,j,I,k}$, can satisfy the following equations respectively:

$$VNE_{i,j,R,k} = \text{Log}\left(\sum_{a \in E_{R,k,0}} e^{\frac{(Re(\gamma_{i,j} \cdot z_{i,j}) - \|\gamma_{i,j}\|^2 \cdot a)^2}{2 \cdot \|\gamma_{i,j}\|^2 \cdot \left(\frac{\varepsilon^2}{N}\right)_{i,j}}}\right) - \text{Log}\left(\sum_{a \in E_{R,k,1}} e^{\frac{(Re(\gamma_{i,j} \cdot z_{i,j}) - \|\gamma_{i,j}\|^2 \cdot a)^2}{2 \cdot \|\gamma_{i,j}\|^2 \cdot \left(\frac{\varepsilon^2}{N}\right)_{i,j}}}\right)$$

and $$VNE_{i,j,I,k} = \text{Log}\left(\sum_{a \in E_{I,k,0}} e^{\frac{(Re(\gamma_{i,j} \cdot z_{i,j}) - \|\gamma_{i,j}\|^2 \cdot a)^2}{2 \cdot \|\gamma_{i,j}\|^2 \cdot \left(\frac{\varepsilon^2}{N}\right)_{i,j}}}\right) - \text{Log}\left(\sum_{a \in E_{I,k,1}} e^{\frac{(Re(\gamma_{i,j} \cdot z_{i,j}) - \|\gamma_{i,j}\|^2 \cdot a)^2}{2 \cdot \|\gamma_{i,j}\|^2 \cdot \left(\frac{\varepsilon^2}{N}\right)_{i,j}}}\right)$$

where $(\varepsilon_2/N)_{i,j}$ corresponds to a noise power value relative to reception of an emitted symbol $S_{i,j}$, said noise power value $(\varepsilon^2/N)_{i,j}$ being obtained in step /b/ from M estimated noise power values $\varepsilon^2/N$, determined for the M reference symbols block respectively; and where $\gamma_{i,j}$ is a propagation channel estimating coefficient applied to the received symbol $Z_{i,j}$ corresponding to the symbol $S_{i,j}$ in the emitted frame and obtained from M estimating coefficients γ of the propagation channel obtained for the M reference symbol blocks;

where $E_{R,k,0}$ corresponds to a set of amplitude values a taken on by the $4^n$QAM modulation along the real axis that correspond to emitted symbols for which the bit carried by the modulation real axis with rank k is equal to 0;

where $E_{R,k,1}$ corresponds to a set of amplitude values a taken on by the $4^n$QAM modulation along the real axis that correspond to emitted symbols for which the bit carried by the modulation real axis with rank k is equal to 1;

where $E_{I,k,0}$ corresponds to a set of amplitude values a taken on by the $4^n$QAM modulation along the imaginary axis that correspond to emitted symbols for which the bit carried by the modulation imaginary axis with rank k is equal to 0; and where $E_{I,k,1}$ corresponds to a set of amplitude values a taken on by the $4^n$QAM modulation along the imaginary axis that correspond to emitted symbols for which the bit carried by the modulation imaginary axis with rank k is equal to 1.

7. The signal reception method according to claim 4, wherein the telecommunication network is based on an OFDM -$4^n$QAM modulation represented in complex form on a real axis and an imaginary axis;
   wherein said method also includes a step consisting of calculating a likelihood value of a bit carried by the real axis of the $4^n$QAM modulation and the imaginary axis of the $4^n$QAM modulation respectively, and with rank k of a symbol in the frame, said symbol occupying a position in the frame with coordinates i and j, said likelihood values $VNE_{i,j,R,k}$, and $VNE_{i,j,I,k}$ satisfying the following equations respectively:

$$VNE_{i,j,R,k} = -\frac{\underset{a \in E_{R,k,0}}{\text{Min}} (Re(\gamma_{i,j} \cdot z_{i,j}) - \|\gamma_{i,j}\|^2 \cdot s)^2}{2 \cdot \|\gamma_{i,j}\|^2 \cdot \left(\frac{\varepsilon^2}{N}\right)_{i,j}} + \frac{\underset{a \in E_{R,k,1}}{\text{Min}} (Re(\gamma_{i,j} \cdot z_{i,j}) - \|\gamma_{i,j}\|^2 \cdot a)^2}{2 \cdot \|\gamma_{i,j}\|^2 \cdot \left(\frac{\varepsilon^2}{N}\right)_{i,j}}$$

and $$VNE_{i,j,I,k} = -\frac{\underset{a \in E_{I,k,0}}{\text{Min}} (Im(\gamma_{i,j} \cdot z_{i,j}) - \|\gamma_{i,j}\|^2 \cdot a)^2}{2 \cdot \|\gamma_{i,j}\|^2 \cdot \left(\frac{\varepsilon^2}{N}\right)_{i,j}} + \frac{\underset{a \in E_{I,k,1}}{\text{Min}} (Im(\gamma_{i,j} \cdot z_{i,j}) - \|\gamma_{i,j}\|^2 \cdot a)^2}{2 \cdot \|\gamma_{i,j}\|^2 \cdot \left(\frac{\varepsilon^2}{N}\right)_{i,j}}$$

where $(\varepsilon^2/N)_{i,j}$ corresponds to a noise power value relative to reception of an emitted symbol $S_{i,j}$, said noise power value $(\varepsilon^2/N)_{i,j}$ being obtained in step /b/ from M estimated noise power values $\varepsilon^2/N$ respectively, determined for the M reference symbols blocks, and where $\gamma_{i,j}$ is a propagation channel estimating coefficient applied to the received symbol $Z_{i,j}$ corresponding to the symbol $S_{i,j}$ in the emitted frame and obtained from M estimating coefficients γ of the propagation channel obtained for the M reference symbol blocks;

where $E_{R,k,0}$ corresponds to a set of amplitude values a taken on by the $4^n$QAM modulation along the real axis that correspond to emitted symbols for which the bit carried by the modulation real axis with rank k is equal to 0;

where $E_{R,k,1}$ corresponds to a set of amplitude values a taken on by the $4^n$QAM modulation along the real axis that correspond to emitted symbols for which the bit carried by the modulation real axis with rank k is equal to 1;

where $E_{I,k,0}$ corresponds to a set of amplitude values a taken on by the $4^n$QAM modulation along the imaginary axis that correspond to emitted symbols for which the bit carried by the modulation imaginary axis with rank k is equal to 0; and where $E_{I,k,1}$ corresponds to a set of amplitude values a taken on by the $4^n$QAM modulation along the imaginary axis that correspond to emitted symbols for which the bit carried by the modulation imaginary axis with rank k is equal to 1.

8. The signal reception method according to claim 1, wherein in step /a/, an estimated noise power value is obtained for a reference symbols block, starting from a quadratic error $\epsilon^2$ determined for N symbols in the reference symbols block, where N is at least equal to P+1, and satisfying the following equation:

$$\|[Z]\vec{\beta}-\vec{S}\|^2=\epsilon^2$$

the estimated power value for said reference symbols block being equal to $\epsilon^2/N$, where $\epsilon^2/N$ is equal to the quadratic error divided by the number of symbols in the reference symbols block;

where $\vec{S}$ is a column vector with elements N of symbols $S_n$ in said emitted reference symbols block, where n is an integer index between 1 and N;

where [Z] is a matrix with its elements equal to the received symbols $Z_{n,p}$ in the frame, where n represents the matrix row index, n is an integer index between 1 and N, and p represents the column index of the matrix, where p is an integer index between 1 and P, where $Z_{n,p}$ denotes the symbol received on the $p^{th}$ antenna corresponding to the position of symbol $S_n$ in the emitted reference symbols block; and where $\vec{\beta}$ is a column vector with P weighting coefficient elements $\beta_p$, where p varies between 1 and P, $\beta_p$ being the weighting coefficient corresponding to the $p^{th}$ antenna, said P coefficients being determined at frame level relative to said emitted reference symbols block, said P coefficients being associated with the corresponding reference symbol blocks received on the P antennas and that correspond to the emitted reference symbols block;

the P weighting coefficients $\beta_p$ being determined so as said value of the quadratic error $\epsilon^2$ for the emitted reference symbols block is lower than a threshold value, firstly between reference symbols in said emitted block, and secondly symbols obtained from symbols received on each of the P antennas at the positions of the reference symbols corresponding to said emitted block, weighted by the corresponding associated weighting coefficients, respectively.

9. The method set forth in claim 8, wherein the column vector of the weighting coefficients $\vec{\beta}$ preferably satisfies the following equation:

$$\vec{\beta}=[[Z]^{*T}\cdot[z]]^{-1}[Z]^{*T}\cdot\vec{S}$$

where $[Z]^*$ represents the conjugate matrix of matrix [Z], and where $[Z]^{*T}$ represents the transpose of matrix $[Z]^*$.

10. The method according to claim 8 wherein the telecommunication network is based on an OFDM -$4^n$QAM modulation represented in complex form on a real axis and an imaginary axis;

said method also comprising a step consisting of calculating a likelihood value of a bit carried by the real axis of the $4^n$PQAM modulation, respectively on the imaginary axis of the $4^n$QAM modulation, for the rank k bit of a symbol in the frame, said symbol occupying a position in the frame with coordinates i and j, said likelihood values $VNE_{i,j,R,k}$ and $VNE_{i,j,I,k}$ satisfying the following equations respectively:

$$VNE_{i,j,R,k}=\text{Log}\left(\sum_{a\in E_{R,k,0}}e^{\frac{\left(Re\left(\sum_{p=1,P}\beta_{i,j,p}\cdot z_{i,j,p}\right)-a\right)^2}{2\left(\frac{\epsilon^2}{N}\right)_{i,j}}}\right)-$$

$$\text{Log}\left(\sum_{a\in E_{R,k,1}}e^{\frac{\left(Re\left(\sum_{p=1,P}\beta_{i,j,p}\cdot z_{i,j,p}\right)-a\right)^2}{2\left(\frac{\epsilon^2}{N}\right)_{i,j}}}\right)$$

and:

$$VNE_{i,j,I,k}=\text{Log}\left(\sum_{a\in E_{I,k,0}}e^{\frac{\left(Im\left(\sum_{p=1,P}\beta_{i,j,p}\cdot z_{i,j,p}\right)-a\right)^2}{2\left(\frac{\epsilon^2}{N}\right)_{i,j}}}\right)-$$

$$\text{Log}\left(\sum_{a\in E_{I,k,1}}e^{\frac{\left(Im\left(\sum_{p=1,P}\beta_{i,j,p}\cdot z_{i,j,p}\right)-a\right)^2}{2\left(\frac{\epsilon^2}{N}\right)_{i,j}}}\right)$$

$(\epsilon^2/N)_{i,j}$ corresponds to a noise power value on reception of an emitted symbol $S_{i,j}$, said noise power value $(\epsilon^2/N)_{i,j}$ being obtained in step /b/ from M estimated noise power values $\epsilon^2/N$ determined for the M reference symbol blocks respectively, where $\beta_{i,j,p}$ corresponds to a weighting coefficient applied to the symbol $Z_{i,j,p}$, received on the $p^{th}$ antenna and corresponding to the symbol $S_{i,j}$ in the emitted frame;

where $E_{R,k,0}$ corresponds to a set of amplitude values a taken on by the $4^n$QAM modulation along the real axis that correspond to emitted symbols for which the bit carried by the modulation real axis with rank k is equal to 0;

where $E_{R,k,1}$ corresponds to a set of amplitude values a taken on by the $4^n$QAM modulation along the real axis that correspond to emitted symbols for which the bit carried by the modulation real axis with rank k is equal to 1;

where $E_{I,k,0}$ corresponds to a set of amplitude values a taken on by the $4^n$QAM modulation along the imaginary axis that correspond to emitted symbols for which the bit carried by the modulation imaginary axis with rank k is equal to 0; and where $E_{I,k,1}$ corresponds to a set of amplitude values a taken on by the $4^n$QAM modulation along the imaginary axis that correspond to emitted symbols for which the bit carried by the modulation imaginary axis with rank k is equal to 1.

11. The reception method according to claim 8, wherein the telecommunication network is based on an OFDM -$4^n$QAM modulation represented in complex form on a real axis and an imaginary axis;

said method also including a step consisting of calculating a likelihood value of a bit carried on the real axis of the $4^n$QAM modulation, respectively on the imaginary axis of the $4^n$QAM modulation, and with rank k of a symbol in the frame, said symbol occupying a position in the frame with coordinates i and j, the likelihood values $VNE_{i,j,R,k}$ and $VNE_{i,j,I,k}$, satisfying the following equations respectively:

$$VNE_{i,j,R,k} = -\frac{\underset{a \in E_{R,k,0}}{\text{Min}}\left[\left(\text{Re}\left(\sum_{p=1,P}\beta_{i,j,p} \cdot z_{i,j,p}\right) - a\right)^2\right]}{2 \cdot \left(\frac{\varepsilon^2}{N}\right)_{i,j}} +$$

$$\frac{\underset{a \in E_{R,k,1}}{\text{Min}}\left[\left(\text{Re}\left(\sum_{p=1,P}\beta_{i,j,p} \cdot z_{i,j,p}\right) - a\right)^2\right]}{2 \cdot \left(\frac{\varepsilon^2}{N}\right)_{i,j}}$$

and:

$$VNE_{i,j,I,k} = -\frac{\underset{a \in E_{I,k,0}}{\text{Min}}\left[\left(\text{Im}\left(\sum_{p=1,P}\beta_{i,j,p} \cdot z_{i,j,p}\right) - a\right)^2\right]}{2 \cdot \left(\frac{\varepsilon^2}{N}\right)_{i,j}} +$$

$$\frac{\underset{a \in E_{I,k,1}}{\text{Min}}\left[\left(\text{Im}\left(\sum_{p=1,P}\beta_{i,j,p} \cdot z_{i,j,p}\right) - a\right)^2\right]}{2 \cdot \left(\frac{\varepsilon^2}{N}\right)_{i,j}}$$

where $(\varepsilon^2/N)_{i,j}$ corresponds to a noise power value on reception of an emitted symbol $S_{i,j}$, said noise power value $(\varepsilon^2/N)_{i,j}$ being obtained in step /b/ from M estimated noise power values $\varepsilon^2/N$ determined for the M reference symbol blocks respectively, where $\beta_{i,j,p}$ corresponds to a weighting coefficient applied to the symbol $Z_{i,j,p}$, received on the $p^{th}$ antenna and corresponding to the symbol $S_{i,j}$ in the emitted frame;

where $E_{R,k,0}$ corresponds to a set of amplitude values a taken on by the $4^n$QAM modulation along the real axis that correspond to emitted symbols for which the bit carried by the modulation real axis with rank k is equal to 0;

where $E_{R,k,1}$ corresponds to a set of amplitude values a taken on by the $4^n$QAM modulation along the real axis that correspond to emitted symbols for which the bit carried by the modulation real axis with rank k is equal to 1;

where $E_{I,k,0}$ corresponds to a set of amplitude values a taken on by the $4^n$QAM modulation along the imaginary axis that correspond to emitted symbols for which the bit carried by the modulation imaginary axis with rank k is equal to 0; and where $E_{I,k,1}$ corresponds to a set of amplitude values a taken on by the $4^n$QAM modulation along the imaginary axis that correspond to emitted symbols for which the bit carried by the modulation imaginary axis with rank k is equal to 1.

12. The reception method according to claim 1, wherein when P is equal to 1 and when the received signal is a multi carrier signal of the OFDM/IOTA or OFDM/OQAM type received by an antenna on a propagation channel, in step /a/, an estimated noise power value can then be determined relative to a reference symbols block, starting from a quadratic error $\varepsilon^2$ determined for the N symbols in the reference symbols block, where N is equal to at least 3 and satisfying the following equation:

$$\left\|\text{Re}((1/\gamma) \cdot \vec{ZZ}) - \vec{SS}\right\|^2 = \varepsilon^2$$

the estimated power value for said reference symbols block being equal to $\varepsilon^2/N$, in other words equal to the quadratic error $\varepsilon^2$ divided by the number of symbols in the reference symbols block;

where $\gamma$ is a estimating coefficient for said propagation channel determined for said reference symbols block;

the propagation channel estimating coefficient being determined so as said quadratic error value $\varepsilon^2$ for the emitted reference symbols block is lower than a threshold value, firstly between the symbols received on the antenna at the positions of the reference symbols corresponding to said the emitted block divided by said channel estimating coefficient, and secondly reference symbols of said emitted block;

where $\vec{SS}$ is a column vector with N symbol elements $SS_n$ deduced from the reference symbols $S_n$ in the emitted symbols block, where n is an integer index between 1 and N, where $SS_n$ is obtained by transformation of the reference symbol $S_n$ in the emitted reference symbols block, said transformation being defined according to the following two rules:

$SS_n = S_n$; if the reference symbol $S_n$ is a pure real;
$SS_n = -j \cdot S_n$; if the reference symbol $S_n$ is a pure imaginary, where j is the square root of $-1$ and where $\vec{ZZ}$ is then a column vector with its elements being the symbols $ZZ_n$ in the received frame, where n is an integer index between 1 and N, where $ZZ_n$ is obtained by transformation of the received symbol $Z_n$ corresponding to the position of the symbol $S_n$ in the emitted reference symbols block, said transformation being defined according to the following two rules:

$ZZ_n = Z_n$; if the corresponding transmitted symbol $S_{i,j}$ is a pure real;
$ZZ_n = -j \cdot Z_n$; if the corresponding transmitted symbol $S_{i,j}$ is a pure imaginary.

13. The method set forth in claim 12, wherein the coefficient for estimating the propagation channel $\gamma$ satisfies the following equation:

$$\begin{bmatrix}\text{Re}(1/\gamma) \\ \text{Im}(1/\gamma)\end{bmatrix} = M \cdot \begin{bmatrix}\text{Re}(\vec{ZZ}^{*T} \cdot \vec{SS}) \\ \text{Im}(\vec{ZZ}^{*T} \cdot \vec{SS})\end{bmatrix}$$

where $\vec{ZZ}^*$ represents the conjugate column vector of the column vector $\vec{ZZ}$, and where $\vec{ZZ}^{*T}$ represents the transpose of the column vector $\vec{ZZ}^*$, where M is a matrix defined by:

$$M = \begin{bmatrix}\|\text{Re}(\vec{ZZ})\|^2 & -\text{Re}(\vec{ZZ})^T \cdot \text{Im}(\vec{ZZ}) \\ -\text{Im}(\vec{ZZ})^T \cdot \text{Re}(\vec{ZZ}) & \|\text{Im}(\vec{ZZ})\|^2\end{bmatrix}^{-1}$$

where $\vec{ZZ}^T$ represents the transpose of the column vector $\vec{ZZ}$.

14. The reception method according to claim 12 comprising, when the telecommunication network is based on an OFDM/IOTA or OFDM/OQAM system using symbols modulated with a $2^n$ ASK modulation;
a step consisting of calculating a likelihood value of a rank k bit carried by the $2^n$ ASK modulation of a symbol of the frame, said symbol occupying a position in the frame with coordinates i and j, said likelihood value $VNE_{i,j,k}$, satisfying the following equation:

$$VNE_{i,j,k} = \mathrm{Log}\left(\sum_{a \in E_{k,0}} e^{\frac{(\mathrm{Re}(\gamma_{i,j} \cdot zz_{i,j}) - \|\gamma_{i,j}\|^2 \cdot a)^2}{2 \cdot \|\gamma_{i,j}\|^2 \cdot \left(\frac{\varepsilon^2}{N}\right)_{i,j}}}\right) - \mathrm{Log}\left(\sum_{a \in E_{k,1}} e^{\frac{(\mathrm{Re}(\gamma_{i,j} \cdot zz_{i,j}) - \|\gamma_{i,j}\|^2 \cdot a)^2}{2 \cdot \|\gamma_{i,j}\|^2 \cdot \left(\frac{\varepsilon^2}{N}\right)_{i,j}}}\right)$$

where $(\varepsilon^2/N)_{i,j}$ corresponds to a noise power value for reception of an emitted symbol $S_{i,j}$, said noise power value $(\varepsilon^2/N)_{i,j}$ being obtained in step /b/ from M estimated noise power values $\varepsilon^2/N$ respectively determined for the M reference symbol blocks, where $\gamma_{i,j}$ is a propagation channel estimating coefficient applied to the received symbol $Z_{i,j}$ corresponding to symbol $S_{i,j}$ in the emitted frame and obtained from M estimating coefficients $\gamma$ of the propagation channel obtained for the M reference symbol blocks;

where $E_{k,0}$ corresponds to a set of amplitude values a taken on by the $2^n$ ASK modulation that correspond to emitted symbols for which the rank k bit carried by the modulation axis is equal to the value 0;

where $E_{k,1}$ corresponds to a set of amplitude values a taken on by the $2^n$ ASK modulation that correspond to emitted symbols for which the rank k bit carried by the modulation axis is equal to the value 1.

15. The reception method according to claim 12 comprising, when the telecommunication network is based on an OFDM/IOTA or OFDM/OQAM system using symbols modulated with a $2^n$ ASK modulation,
a step consisting of calculating a likelihood value of a rank k bit carried by the $2^n$ ASK modulation of a symbol of the frame, said symbol occupying a position in the frame with coordinates i and j, said likelihood value $VNE_{i,j,k}$, satisfying the following equation:

$$VNE_{i,j,k} = -\frac{\min_{a \in E_{k,0}}(\mathrm{Re}(\gamma_{i,j} \cdot zz_{i,j}) - \|\gamma_{i,j}\|^2 \cdot a)^2}{2 \cdot \|\gamma_{i,j}\|^2 \cdot \left(\frac{\varepsilon^2}{N}\right)_{i,j}} + \frac{\min_{a \in E_{k,1}}(\mathrm{Re}(\gamma_{i,j} \cdot zz_{i,j}) - \|\gamma_{i,j}\|^2 \cdot a)^2}{2 \cdot \|\gamma_{i,j}\|^2 \cdot \left(\frac{\varepsilon^2}{N}\right)_{i,j}}$$

where $(\varepsilon^2/N)_{i,j}$ corresponds to a noise power value for reception of an emitted symbol $S_{i,j}$, said noise power value $(\varepsilon^2/N)_{i,j}$ being obtained in step /b/ from M estimated noise power values $\varepsilon^2/N$ respectively determined for the M reference symbol blocks, where $\gamma_{i,j}$ is a propagation channel estimating coefficient applied to the received symbol $Z_{i,j}$ corresponding to symbol $S_{i,j}$ in the emitted frame and obtained from M estimating coefficients $\gamma$ of the propagation channel obtained for the M reference symbol blocks;

where $E_{k,0}$ corresponds to a set of amplitude values a taken on by the $2^n$ ASK modulation that correspond to emitted symbols for which the rank k bit carried by the modulation axis is equal to the value 0;

where $E_{k,1}$ corresponds to a set of amplitude values a taken on by the $2^n$ ASK modulation that correspond to emitted symbols for which the rank k bit carried by the modulation axis is equal to the value 1;

where $[ZZ]$ is a matrix with its elements being symbols $ZZ_{n,p}$ in the received frame, where n represents the row index of the matrix, n is an integer index between 1 and N, and p represents the column index of the matrix and is an integer index between 1 and P, where $ZZ_{n,p}$ is obtained by transformation of the symbol $Z_{n,p}$ received on the $p^{th}$ antenna and corresponding to the position of the symbol $S_n$ in the emitted reference symbols block, said transformation being defined according to the following two rules:

$ZZ_{i,j}=Z_{i,j}$; if the corresponding transmitted symbol $S_{i,j}$ is a pure real;
$ZZ_{i,j}=-j \cdot Z_{i,j}$; if the corresponding transmitted symbol $S_{i,j}$ is a pure imaginary.

16. The reception method, according to claim 1, wherein when the received signal is a multi carrier signal of the OFDM/IOTA or OFDM/OQAM type an estimated noise power value is determined relative to a reference symbols block, starting from a quadratic error $\varepsilon^2$ determined for the N symbols in the reference symbols block, where N is equal to at least $2 \cdot P+1$, and satisfying the following equation:

$$\left\|\mathrm{Re}[ZZ] \cdot \vec{\beta} - \vec{SS}\right\|^2 = \varepsilon^2$$

where $\vec{SS}$ is a column vector with N symbol elements $SS_n$ deduced from the reference symbols $S_n$ in the emitted symbols block, where n is an integer number between 1 and N, where $SS_n$ is obtained by transformation of the reference symbol $S_n$ in the emitted reference symbols block, said transformation being defined according to the following two rules:

$SS_n=S_n$; if the reference symbol $S_n$ is a pure real;
$SS_n=-j \cdot S_n$; if the reference symbol $S_n$ is a pure imaginary, where j is the square root of $-1$, and where $[ZZ]$ is a matrix with its elements being symbols $ZZ_{n,p}$ in the received frame, where n represents the row index of the matrix, n is an integer index between 1 and N, and p represents the column index of the matrix and is an integer index between 1 and P, where $ZZ_{n,p}$ is obtained by transformation of the symbol $Z_{n,p}$ received on the $p^{th}$ antenna and corresponding to the position of the symbol $S_n$ in the emitted reference symbols block, said transformation being defined according to the following two rules:

$ZZ_{i,j}=Z_{i,j}$; if the corresponding transmitted symbol $S_{i,j}$ is a pure real;
$ZZ_{i,j}=-j \cdot Z_{i,j}$; if the corresponding transmitted symbol $S_{i,j}$ is a pure imaginary; and where $\vec{\beta}$ is a column vector with P weighting coefficient elements $\beta p$, for p varying between 1 and P, $\beta p$ being the weighting coefficient corresponding to the $p^{th}$ antenna, said P coefficients being determined at frame level for said emitted reference symbols block, said P coefficients $\beta_p$ being associated with reference symbol blocks received on the P antennas and that correspond to the emitted reference symbols block;

the P weighting coefficients being determined so as to increase said quadratic error value $\epsilon^2$ for the emitted reference symbols block by a threshold value, firstly between the reference symbols in the emitted block considered and secondly the symbols obtained from symbols received on each of the P antennas at the positions of the reference symbols corresponding to said emitted block, weighted by the associated weighting coefficients.

17. The reception method according to claim 16, wherein the column vector $\vec{\beta}$ of weighting coefficients satisfies the following equation:

$$\begin{bmatrix} \mathrm{Re}(\vec{\beta}) \\ \mathrm{Im}(\vec{\beta}) \end{bmatrix} = M \cdot \begin{bmatrix} \mathrm{Re}([ZZ]^{*T} \cdot \vec{SS}) \\ \mathrm{Im}([ZZ]^{*T} \cdot \vec{SS}) \end{bmatrix}$$

where M is a matrix defined by blocks according to the following equation:

$$M = \begin{bmatrix} \|\mathrm{Re}([ZZ])\|^2 & -\mathrm{Re}([ZZ])^T \cdot \mathrm{Im}([ZZ]) \\ -\mathrm{Im}([ZZ]^T) \cdot \mathrm{Re}([ZZ]) & \|\mathrm{Im}([ZZ])\|^2 \end{bmatrix}^{-1}.$$

18. The reception method according to claim 16 including, when the telecommunication network is based on an OFDM/IOTA or an OFDM/OQAM system using symbols modulated with a $2^n$ASK modulation,
a step consisting of calculating a likelihood value of a rank k bit carried by the $2^n$ASK modulation of a symbol in the frame, said symbol occupying a position in the frame with coordinates i and j, said likelihood value $VNE_{i,j,R,k}$ satisfying the following equation:

$$VNE_{i,j,R,k} =$$

$$\mathrm{Log}\left(\sum_{a \in E_{R,k,0}} e^{\frac{(\mathrm{Re}(\gamma_{i,j} \cdot zz_{i,j}) - \|\gamma_{i,j}\|^2 \cdot a)^2}{2 \cdot \|\gamma_{i,j}\|^2 \cdot \left(\frac{\epsilon^2}{N}\right)_{i,j}}}\right) - \mathrm{Log}\left(\sum_{a \in E_{R,k,1}} e^{\frac{(\mathrm{Re}(\gamma_{i,j} \cdot zz_{i,j}) - \|\gamma_{i,j}\|^2 \cdot a)^2}{2 \cdot \|\gamma_{i,j}\|^2 \cdot \left(\frac{\epsilon^2}{N}\right)_{i,j}}}\right)$$

where $(\epsilon^2/N)_{i,j}$ corresponds to a noise power value relative to reception of an emitted symbol $S_{i,j}$, said noise power value $(\epsilon^2/N)_{i,j}$ being obtained in step /b/ from M estimated noise power values $\epsilon^2/N$ determined for the M reference symbols blocks respectively, where $\gamma_{i,j}$ is a propagation channel estimating coefficient applied to the received symbol $Z_{i,j}$ corresponding to symbol $S_{i,j}$ in the emitted frame and obtained from M estimating coefficients $\gamma$ of the propagation channel obtained for the M reference symbol blocks;

where $\beta_p$ is the weighting coefficient applied to the symbol $Z_{i,j,p}$ received on the $p^{th}$ antenna and corresponding to the symbol $S_{i,j}$ in the emitted frame;

where $E_{R,k,0}$ corresponds to a set of amplitude values a taken on by the $2^n$ASK modulation that correspond to emitted symbols for which the rank k bit carried by the modulation axis is equal to 0;

where $E_{R,k,1}$ corresponds to a set of amplitude values a taken on by the $2^n$ASK modulation that correspond to emitted symbols for which the rank k bit carried by the modulation axis with is equal to 1.

19. The reception method according to claim 16 including, when the telecommunication network is based on an OFDM/IOTA or an OFDM/OQAM system using symbols modulated with a $2^n$ASK modulation,
a step consisting of calculating a likelihood value of a rank k bit carried by the $2^n$ASK modulation of a symbol in the frame, said symbol occupying a position in the frame with coordinates i and j, said likelihood value $VNE_{i,j,R,k}$ satisfying the following equation:

$$VNE_{i,j,R,k} =$$

$$-\frac{\displaystyle\min_{a \in E_{R,k,0}} (\mathrm{Re}(\gamma_{i,j} \cdot z_{i,j}) - \|\gamma_{i,j}\|^2 \cdot s)^2}{2 \cdot \|\gamma_{i,j}\|^2 \cdot \left(\frac{\epsilon^2}{N}\right)_{i,j}} + \frac{\displaystyle\min_{a \in E_{R,k,1}} (\mathrm{Re}(\gamma_{i,j} \cdot z_{i,j}) - \|\gamma_{i,j}\|^2 \cdot a)^2}{2 \cdot \|\gamma_{i,j}\|^2 \cdot \left(\frac{\epsilon^2}{N}\right)_{i,j}}$$

where $(\epsilon^2/N)_{i,j}$ corresponds to a noise power value relative to reception of an emitted symbol $S_{i,j}$, said noise power value $(\epsilon^2/N)_{i,j}$ being obtained in step /b/ from M estimated noise power values $\epsilon^2/N$ determined for the M reference symbols blocks respectively, where $\gamma_{i,j}$ is a propagation channel estimating coefficient applied to the received symbol $Z_{i,j}$ corresponding to symbol $S_{i,j}$ the emitted frame and obtained from M estimating coefficients $\gamma$ of the propagation channel obtained for the M reference symbol blocks;

where $\beta_p$ is the weighting coefficient applied to the symbol $Z_{i,j,p}$ received on the $p^{th}$ antenna and corresponding to the symbol $S_{i,j}$ in the emitted frame;

where $E_{R,k,0}$ corresponds to a set of amplitude values a taken on by the $2^n$ASK modulation that correspond to emitted symbols for which the rank k bit carried by the modulation axis is equal to 0;

where $E_{R,k,1}$ corresponds to a set of amplitude values a taken on by the $2^n$ASK modulation that correspond to emitted symbols for which the rank k bit carried by the modulation axis with is equal to 1.

20. A reception device for using a method according to claim 1, including:
a determining unit adapted to determine M values of the estimated noise power at the frame level, each relating to one of the M blocks of reference symbols emitted;
an obtaining unit adapted to obtain values of the estimated noise power for other symbols in the frame by interpoling said noise power values estimated by the determination unit.

21. A telecommunication system comprising:
an emission device adapted to emit a multi-carrier signal transmitted in the form of successive frames comprising symbols occupying corresponding positions distributed along a time axis and along a frequency axis; one frame comprising M blocks each with at least N reference symbols, the reference symbols in each of the blocks satisfying a first maximum spacing between each other along the time axis and a second maximum spacing between each other along the frequency axis, less than a first value and a second value respectively, where M is an integer number equal to at least two; and
a reception device according to claim 20.

* * * * *